(12) United States Patent
Yamazaki et al.

(10) Patent No.: US 11,329,336 B2
(45) Date of Patent: May 10, 2022

(54) BATTERY PACK AND BATTERY PACK MANUFACTURING METHOD

(71) Applicant: TOYOTA JIDOSHA KABUSHIKI KAISHA, Toyota (JP)

(72) Inventors: Nobuyuki Yamazaki, Okazaki (JP); Syoma Minami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/718,512

(22) Filed: Dec. 18, 2019

(65) Prior Publication Data

US 2020/0235351 A1 Jul. 23, 2020

(30) Foreign Application Priority Data

Jan. 17, 2019 (JP) .............................. JP2019-006060

(51) Int. Cl.
*H01M 50/169* (2021.01)
*H01M 50/155* (2021.01)
*H01M 50/502* (2021.01)
*H01M 50/543* (2021.01)

(52) U.S. Cl.
CPC ....... *H01M 50/169* (2021.01); *H01M 50/155* (2021.01); *H01M 50/502* (2021.01); *H01M 50/543* (2021.01)

(58) Field of Classification Search
CPC ....... H01M 50/147–15; H01M 50/166; H01M 50/169; H01M 50/172; H01M 50/174–178; H01M 50/183–188; H01M 50/50–598
See application file for complete search history.

(56) References Cited

U.S. PATENT DOCUMENTS

| 2011/0081569 A1* | 4/2011 | Kim | .................. | B23K 20/1265 |
| | | | | 429/158 |
| 2012/0070705 A1* | 3/2012 | Kim | .................. | H01M 10/0413 |
| | | | | 429/61 |
| 2013/0078506 A1* | 3/2013 | Guen | .................. | H01M 50/543 |
| | | | | 429/179 |
| 2014/0308568 A1* | 10/2014 | Kim | ...................... | H01M 50/15 |
| | | | | 429/158 |
| 2015/0086844 A1* | 3/2015 | Masuda | ................. | H01G 11/74 |
| | | | | 429/158 |

(Continued)

FOREIGN PATENT DOCUMENTS

| JP | 2013-33661 A | 2/2013 |
| JP | 2014-063696 A | 4/2014 |

(Continued)

*Primary Examiner* — Jonathan Crepeau
*Assistant Examiner* — Jacob Buchanan
(74) *Attorney, Agent, or Firm* — Sughrue Mion, PLLC

(57) ABSTRACT

In a laser welding step, a laser beam is irradiated fin a thickness direction of an external terminal from a side of a front surface of a bus bar toward a space. This irradiation melts a separated portion of the external terminal, i.e., a portion located apart from the insulating part by the space between the insulating part and the separated portion in the thickness direction, and an opposed portion of the bus bar, i.e., a portion opposed to the space via the separated portion in the thickness direction, thereby forming a welded portion including the separated portion and the opposed portion melted together.

6 Claims, 11 Drawing Sheets

(56) References Cited

U.S. PATENT DOCUMENTS

| | | | |
|---|---|---|---|
| 2015/0171388 A1 | 6/2015 | Jang et al. | |
| 2015/0180008 A1 | 6/2015 | Lee et al. | |
| 2016/0043353 A1* | 2/2016 | Tsutsumi | H01M 50/172 |
| | | | 429/158 |
| 2016/0248055 A1* | 8/2016 | Jang | H01M 50/172 |
| 2016/0248073 A1* | 8/2016 | Jang | H01M 50/531 |
| 2016/0254517 A1* | 9/2016 | Tsunaki | H01M 50/528 |
| | | | 429/179 |
| 2017/0229686 A1* | 8/2017 | Takasu | H01M 50/172 |

FOREIGN PATENT DOCUMENTS

| | | |
|---|---|---|
| JP | 2015-088464 A | 5/2015 |
| JP | 2016-129125 A | 7/2016 |
| JP | 2017-130387 A | 7/2017 |
| WO | 2014/050329 A1 | 4/2014 |
| WO | 2017/090706 A1 | 6/2017 |

\* cited by examiner

BATTERY PACK AND BATTERY PACK MANUFACTURING METHOD

CROSS-REFERENCE TO RELATED APPLICATIONS

This application is based upon and claims the benefit of priority from the prior Japanese Patent Application No. 2019-006060 filed on Jan. 17, 2019, the entire contents of which are incorporated herein by reference.

BACKGROUND

Technical Field

The present disclosure relates to a battery pack and a method for manufacturing the battery pack.

Related Art

JP 2014-63696A discloses a battery pack including a plurality of cells each provided with an external terminal and a plate-shaped bus bar made of metal, which is placed on the front surface of the external terminal and welded to the external terminal. Each cell includes a metal cell case, a plate-shaped external terminal made of metal and located outside of the cell case, and an insulating part (a part of a gasket) interposed between the front surface of the cell case and the back surface of the external terminal to electrically insulate them from each other. This insulating part is made of resin having an electrical insulation property.

The battery pack in JP 2014-63696A includes a welded portion at which the external terminal and the bus bar are welded together. This welded portion is configured to extend in a thickness direction of the external terminal from the front surface of the bus bar toward the back surface of the external terminal. Specifically, the welded portion is formed to extend from the front surface of the bus bar to any intermediate position between the front surface and the back surface of the external terminal, that is, configured not to penetrate through the external terminal in the thickness direction.

In JP 2014-63696A, the external terminal and the bus bar are welded to each other by laser welding. To be concrete, while the bus bar is placed on the front surface of the external terminal of the cell, a laser beam is irradiated onto the front surface of the bus bar, i.e., from above the bus bar, in the thickness direction of the external terminal, thereby melting a part of the bus bar (i.e., a portion which will form a welded portion) and a part of the external terminal (i.e., a portion which will form the welded portion) to form the welded portion at which the part of the bus bar and the part of the external terminal are welded together.

SUMMARY

Technical Problems

Meanwhile, as a result of the foregoing laser welding, the electrical insulation property of the insulating part made of resin may deteriorate under the influence of heat generated by the laser welding. To be concrete, for instance, when a part of the bus bar (the portion which will form the welded portion) and the part of the external terminal (the portion which will form the welded portion) are melted by irradiation of a laser beam, the heat from molten metal (i.e., molten metal of the melted bus bar or the melted external terminal) and others may be transferred to the insulating part in contact with the back surface of the external terminal, leading to lowering of the electrical insulation property of the insulating part. This may deteriorate the electrical insulation between the cell case and the external terminal.

The present disclosure has been made to address the above problems and has a purpose to provide a method for manufacturing a battery pack configured to ensure electrical insulation between a cell case and an external terminal, and the battery pack configured to ensure electrical insulation between a cell case and an external terminal.

Means of Solving the Problems

To achieve the above-mentioned purpose, one aspect of the present disclosure provides a method for manufacturing a battery pack, the battery pack comprising: a plurality of cells each including an external terminal; and a bus bar made of metal in a plate shape, the bus bar being placed on and welded to a front surface of the external terminal, wherein each of the cells comprises: a metal cell case; the external terminal made of metal in a plate shape and placed on an outside of the cell case; and an insulating part made of resin having an electrical insulation property and interposed between a front surface of the cell case and a back surface of the external terminal to electrically insulate the cell case and the external terminal from each other, the battery pack includes a welded portion at which the external terminal and the bus bar are welded together, the welded portion being configured to extend in a thickness direction of the external terminal from a front surface of the bus bar toward the back surface of the external terminal, and the welded portion is located apart from the insulating part by a space intervening therebetween in the thickness direction of the external terminal, wherein the method comprises: a cell preparing step of preparing a plurality of the cells each provided with the external terminal including a separated portion to be placed apart from the insulating part in the thickness direction by the space intervening between the external terminal and the insulating part; a placing step of placing the bus bar on the front surface of the external terminal of each of the prepared cells so that a part of the bus bar becomes an opposed portion opposed to the space in the thickness direction of the external terminal by interposing the separated portion of the external terminal; and a laser welding step of laser welding the opposed portion of the bus bar to the separated portion of the external terminal, and wherein the laser welding step includes irradiating a laser beam from a side of the front surface of the bus bar toward the space in the thickness direction of the external terminal to melt the opposed portion of the bus bar and the separated portion of the external terminal to form the welded portion at which the separated portion and the opposed portion are welded together.

The foregoing method is configured to manufacture the battery pack provided with the plurality of cells each including the external terminal, and the bus bar made of metal in a plate shape and placed on the front surface of the external terminal and welded to the external terminal. Each cell includes the metal cell case, the plate-shaped external terminal made of metal and placed on the outside of the cell case, and the insulating part made of resin having an electrical insulation property. The insulating part is interposed between the front surface of the cell case and the back surface of the external terminal to electrically insulate the cell case and the external terminal from each other.

Furthermore, the battery pack includes the welded portion at which the external terminal and the bus bar are welded together. This welded portion is configured to extend in the thickness direction of the external terminal from the front surface of the bus bar toward the back surface of the external terminal. Further, this welded portion is located apart from the insulating part by the space intervening between the welded portion and the insulating part in the thickness direction of the external terminal. In other words, the space intervenes between the welded portion and the insulating part in the thickness direction of the external terminal. Herein, the thickness direction of the external terminal indicates a direction straight from the front surface to the back surface (alternatively from the back surface to the front surface) of the external terminal, which is perpendicular to the front surface or back surface.

In the foregoing manufacturing method, the battery pack configured as above is manufactured by the following steps.

In the cell preparing step, firstly, a plurality of cells (cells in which the bus bars are not welded yet to the external terminals, that is, cells in which the welded portions are not formed yet) are prepared. To be concrete, in the cell preparing step, a plurality of cells are prepared such that each cell is provided with an external terminal including a separated portion which is a portion to be placed apart from the insulating part by the space intervening between the external terminal and the insulating part in the thickness direction of the external terminal.

In the placing step, successively, the bus bars are placed on the front surfaces of the external terminals of the prepared cells. In this placing step, however, the bus bars are disposed on the front surfaces of the external terminals of the cells so that a part of each bus bar becomes the opposed portion located facing the space by interposing the separated portion of the external terminal in the thickness direction of the external terminal.

In the subsequent laser welding step, the opposed portion of the bus bar and the separated portion of the external terminal are welded together by laser. In this laser welding step, a laser beam is irradiated in the thickness direction of the external terminal from the side of (i.e., from a position distance from) the front surface of the bus bar (i.e., the opposed portion) onto the front surface of the bus bar toward the space to melt the opposed portion of the bus bar and the separated portion of the external terminal, thereby forming the welded portion at which the separated portion and the opposed portion are welded together. More specifically, the welded portion is formed to extend in the thickness direction of the external terminal from the front surface of the bus bar toward the back surface of the external terminal and further to be placed apart from the insulating part by the space intervening therebetween in the thickness direction of the external terminal, i.e., by the space intervening between the welded portion and the insulating part in the thickness direction of the external terminal.

According to such a laser welding step, the heat generated in the external terminal and others by laser welding is less likely to conduct to the insulating part made of resin. Specifically, in the laser welding step, the space intervenes between the molten resin portion melted by irradiation of the laser beam, i.e., the molten resin portion formed by the melted opposed portion of the bus bar or melted separated portion of the external terminal and the insulating part in the thickness direction of the external terminal. Thus, the heat of the molten resin portion is less transferred to the insulating part. Accordingly, the electrical insulation property of the insulating part can be prevented from lowering under the influence of the heat generated by laser welding. This can ensure electrical insulation between the cell case and the external terminal.

Concrete examples where the heat generated by laser welding causes lowering of the electrical insulation property of the insulating part may include the following cases. For example, when the heat generated by laser welding conducts to the insulating part, the insulating part may be deformed to thin down the thickness of a part of the insulating part, alternatively, to form a hole(s) in a part of the insulating part, resulting in deterioration in electrical insulation property of the insulating part. In another case, the insulating part may be partly carbonized due to the heat generated by laser welding and thus the carbonized portion is reduced in electric resistivity, that is, increased in electrical conductivity, resulting in deterioration in electrical insulation property of the insulating part.

As an alternative, the welded portion may be configured to extend from the front surface of the opposed portion of the bus bar to the back surface of the separated portion of the external terminal, that is, to penetrate through the opposed portion of the bus bar and the separated portion of the external terminal in the thickness direction. As another alternative, the welded portion may be configured to extend from the front surface of the opposed portion of the bus bar to an intermediate position between the front surface and the back surface of the separated portion of the external terminal, that is, not to penetrate through the separated portion of the external terminal in the thickness direction.

The foregoing manufacturing method of the battery pack may also be configured such that the external terminal includes a terminal recess having an opening in the back surface of the external terminal, the terminal recess configured to be recessed in a direction away from a front surface of the insulating part, the front surface facing the back surface of the external terminal, and the space is an enclosed space defined by the terminal recess of the external terminal and the front surface of the insulating part that closes the opening of the terminal recess.

In the foregoing manufacturing method, the external terminal of the cell used therein includes a terminal recess that opens, or that has an opening, in the back surface of the external terminal and is recessed in a direction away from the front surface of the insulating part. The cell used therein is configured such that the space is an enclosed space defined by the terminal recess of the external terminal and the front surface of the insulating part that closes the opening of the terminal recess. Since the cells configured as above are prepared in the cell preparing step, and then the foregoing placing step and the laser welding step are performed, the electrical insulation property of the insulating part can be prevented from lowering under the influence of the heat generated by laser welding and thus the electrical insulation property between the cell case and the external terminal can be enhanced.

Still further, one of the foregoing manufacturing methods of a battery pack may be configured such that the laser welding step includes performing penetration laser welding to make a molten metal portion melted by irradiation of the laser beam so as to extend from the front surface of the bus bar to the space to form the welded portion extending from a front surface of the opposed portion of the bus bar to a back surface of the separated portion of the external terminal.

In the above manufacturing method, the laser welding step is configured to perform penetration laser welding to make the molten metal portion melted by laser beam irradiation extend from the front surface of the bus bar to the space to form the welded portion extending from the front surface of the opposed portion of the bus bar to the back surface of the separated portion of the external terminal. It is to be noted that the molten metal portion is a melted portion of the metal constituting the opposed portion of the bus bar or the metal constituting the separated portion of the external terminal.

Such penetration laser welding performed to make the molten metal portion reach the space enables at least a part of gas (air bubbles) contained in the molten metal part to be released into the space. This process can reduce voids (e.g., micro-voids formed by air bubbles) which may be generated in the welded portion, and thus enhance the strength of the welded portion. Further this process can also enhance the electrical conductivity of the welded portion and hence decrease the connection resistance between the bus bar and the external terminal.

Furthermore, the space configured as an enclosed space as above can accommodate or collect therein at least a part of foreign substances such as spatters generated during welding. Accordingly, the amount of foreign substances such as spatters dispersed outward can be reduced, leading to lowering of pollution in external environment.

Furthermore, one of the manufacturing methods of the battery pack may be configured such that the external terminal includes a terminal protruding portion protruding from the front surface, the bus bar includes a concave bus-bar recess allowing the terminal protruding portion to be fitted therein, and the placing step includes placing the bus bar on the front surface of the external terminal while making the terminal protruding portion fit in the bus-bar recess.

In the above manufacturing method, the external terminal of each cell is configured to include the terminal protruding portion protruding from the front surface of the external terminal, i.e., protruding on the side on which the bus bar is placed. In addition, the bus bar is configured to include the concave bus-bar recess allowing the terminal protruding portion of the external terminal to be fitted therein.

In the placing step, moreover, the bus bar is placed on the front surface of the external terminal while making the terminal protruding portion of the external terminal fit in the bus-bar recess. In the placing step, when the bus bar is placed on the front surface of the external terminal to make the terminal protruding portion of the external terminal fit in the bus-bar recess, a part of the bus bar becomes the foregoing opposed portion, that is, the portion opposed to the space by interposing the separated portion of the external terminal in the thickness direction of the external terminal.

As above, since the terminal protruding portion of the external terminal is fitted in the bus-bar recess, a subsequent laser welding step can be performed without causing positional displacement of the bus bar with respect to the external terminal.

When the terminal protruding portion of the external terminal is a part of the separated portion, i.e., a front-surface part of the separated portion, and, the bus-bar recess is a part of the opposed portion, i.e., a back-surface part of the opposed portion, the opposed portion can be prevented from displacing in position with respect to the separated portion. This enables appropriate welding of the opposed portion and the separated portion in the laser welding step.

The terminal protruding portion of the external terminal can be formed for example by subjecting a flat plate-shaped external terminal to press working. In addition, at the same time when the flat plate-shaped external terminal is pressed, the terminal protruding portion protruding from the front surface of the external terminal, i.e., protruding on the side on which the bus bar is placed, is formed and also the foregoing terminal recess is formed. The terminal recess is a recessed portion that open, or has an opening, in the back surface of the external terminal and is configured to be recessed in a direction away from the front surface of the insulating part, that is, in a direction from the back surface side to the front surface side of the external terminal. Thus, this terminal recess can constitute the foregoing space.

The bus-bar recess can also be formed by the press-working of the flat plate-shaped bus bar. To be concrete, the bus-bar recess can be formed as a recess that opens, or has an opening, in the back surface of the bus bar and is recessed in a direction away from the front surface of the external terminal, that is, in a direction from the back surface side to the front surface side of the bus bar. At the same time when the flat plate-shaped bus bar is pressed, the foregoing bus-bar recess is formed and also the bus bar protruding portion is formed protruding from the front surface of the bus bar. In this case, in the laser welding step, the laser beam may be directed to impinge on this bus bar protruding portion.

Another aspect of the present disclosure provides a battery pack comprising: a plurality of cells each including an external terminal; and a bus bar made of metal in a plate shape, the bus bar being placed on and welded to a front surface of the external terminal, wherein each of the cells comprises: a metal cell case; the external terminal made of metal in a plate shape and placed on an outside of the cell case; and an insulating part made of resin having an electrical insulation property and interposed between a front surface of the cell case and a back surface of the external terminal to electrically insulate the cell case and the external terminal from each other, the battery pack includes a welded portion at which the external terminal and the bus bar are welded together, the welded portion being configured to extend in a thickness direction of the external terminal from a front surface of the bus bar toward the back surface of the external terminal, and the welded portion is located apart from the insulating part by a space intervening therebetween in the thickness direction of the external terminal.

The above-described battery pack is provided with the plurality of cells each including the external terminal and the plate-shaped bus bar made of metal and placed on and welded to the external terminal. Each cell includes the metal cell case, the plate-shaped external terminal made of metal and placed on the outside of the cell case, and the insulating part made of resin having the electrical insulation property. The insulating part is interposed between the front surface of the cell case and the back surface of the external terminal to electrically insulate between the cell case and the external terminal.

Furthermore, the battery pack includes the welded portion at which the external terminal and the bus bar are welded together. This welded portion is configured to extend in the thickness direction of the external terminal from the front surface of the bus bar toward the back surface of the external terminal. Further, this welded portion is located apart from the insulating part in the thickness direction of the external terminal by the space intervening between the welded portion and the insulating part in the thickness direction of the external terminal. In other words, the space intervenes between the welded portion and the insulating part in the thickness direction of the external terminal.

In the battery pack configured as above, the electrical insulation property of the insulating part is prevented from lowering under the influence of the heat generated by welding between the external terminal and the bus bar. Thus, the battery pack can be configured so that the cell case and the external terminal are reliably electrically insulated from each other. To be concrete, in the welding step (e.g., the laser welding step) of welding the external terminal and the bus bar, when a part of the bus bar which will form the welded portion and a part of the external terminal which will form the welded portion are melted, the heat of the molten metal part is less likely to conduct to the insulating part because of the space intervening between the molten metal part (i.e., the melted portion of the metal constituting the bus bar or the external terminal) and the insulating part in the thickness direction of the external terminal. Accordingly, the electrical insulation property of the insulating part can be prevented from lowering under the influence of the heat generated by welding. This can ensure electrical insulation between the cell case and the external terminal.

The welded portion may be configured to extend from the front surface of the opposed portion of the bus bar to the back surface of the separated portion of the external terminal, that is, to penetrate through the opposed portion of the bus bar and the separated portion of the external terminal in the thickness direction. As an alternative, the welded portion may be configured to extend from the front surface of the opposed portion of the bus bar to an intermediate position between the front surface and the back surface of the separated portion of the external terminal, that is, not to penetrate through the separated portion of the external terminal in the thickness direction.

Furthermore, the foregoing battery pack may be configured such that the external terminal includes a terminal recess having an opening in the back surface of the external terminal, the terminal recess configured to be recessed in a direction away from a front surface of the insulating part the front surface facing the back surface of the external terminal, and the space is an enclosed space defined by the terminal recess of the external terminal and the front surface of the insulating part that closes the opening of the terminal recess.

In the above battery pack, the external terminal of the cell used therein includes a terminal recess that opens, or has an opening, in the back surface of the external terminal and is recessed in a direction away from the front surface of the insulating part. The cell used therein is configured such that the space is an enclosed space defined by the terminal recess of the external terminal and the front surface of the insulating part that closes the opening of the terminal recess. Since the cells configured as above are used, the electrical insulation property of the insulating part can be prevented from lowering under the influence of the heat generated by welding and thus the electrical insulation property between the cell case and the external terminal can be enhanced.

Furthermore, one of the aforementioned battery packs may be configured such that the external terminal includes a separated portion located apart from the insulating part in the thickness direction by the space intervening between the external terminal and the insulating part, the bus bar includes an opposed portion opposed to the space by interposing the separated portion in the thickness direction of the external terminal, and the welded portion at which the separated portion and the opposed portion are welded together is configured to extend from a front surface of the opposed portion to a back surface of the separated portion.

In the above battery pack, the external terminal includes the separated portion located apart from the insulating part by the space intervening between the external terminal and the insulating part in the thickness direction. The bus bar includes the opposed portion opposed to the space by the separated portion intervening between the bus bar and the space in the thickness direction of the external terminal. Furthermore, the welded portion is formed as a welded portion at which the opposed portion and the separated portion are welded together and configured to extend from the front surface of the opposed portion of the bus bar to the back surface of the separated portion of the external terminal. Such the battery pack is a battery pack with the welded portion containing less voids. Thus, the battery pack can be provided with the welded portion having high strength and high electrical conductivity and hence with a low connection resistance between the bus bar and the external terminal.

To be concrete, the welded portion configured to extend from the front surface of the opposed portion of the bus bar to the back surface of the separated portion of the external terminal is made for example by penetration laser welding so that the molten metal portion melted by irradiation of the laser beam, that is, the melted portion of the metal constituting the opposed portion of the bus bar or the melted portion of the metal constituting the separated portion of the external terminal, extends from the front surface of the bus bar to the space. Such penetration laser welding is performed to make the molten metal part reach the space enables at least a part of gas (air bubbles) contained in the molten metal part to be released into the space. This process can reduce voids which may be generated in the welded portion and thus enhance the strength of the welded portion. Further this process can also enhance the electrical conductivity of the welded portion and hence decrease the connection resistance between the bus bar and the external terminal.

Furthermore, when the space configured as enclosed space as above can accommodate or collect therein at least a part of foreign substances such as spatters generated during welding. Accordingly, the amount of foreign substances such as spatters dispersed outward can be reduced, leading to lowering of pollution in external environment.

Furthermore, one of the foregoing battery packs may be configured such that the external terminal includes a terminal protruding portion protruding from the front surface, the bus bar includes a concave bus-bar recess allowing the terminal protruding portion to be fitted therein, and the external terminal and the bus bar are welded to each other while the terminal protruding portion is fitted in the bus-bar recess.

In the above battery pack, the external terminal of each cell is configured to include the terminal protruding portion protruding from the front surface of the external terminal, i.e., protruding on the side on which the bus bar is placed. In addition, the bus bar is configured to include the concave bus-bar recess allowing the terminal protruding portion of the external terminal to be fitted. In the above battery pack, the external terminal and the bus bar are welded together while the terminal protruding portion is fitted in the bus-bar recess.

Since the external terminal and the bus bar are welded together while the terminal protruding portion is fitted in the bus-bar recess, this configuration can prevent positional displacement of the bus bar with respect to the external terminal, which may be caused at the time when the external terminal is welded to the bus bar. Therefore, the above battery pack is a battery pack with the bus bar welded to the external terminal while the bus bar is held at an appropriate position with respect to the external terminal.

The terminal protruding portion of the external terminal can be formed for example by subjecting a flat plate-shaped external terminal to press working. In addition, at the same time when the flat plate-shaped external terminal is pressed, the terminal protruding portion protruding from the front surface of the external terminal, i.e., protruding on the side on which the bus bar is placed, is formed and also the foregoing terminal recess is formed. Thus, this terminal recess can constitute the foregoing space.

DETAILED DESCRIPTION OF THE EXEMPLARY EMBODIMENTS

First Example

A detailed description of a first example of this disclosure will now be given referring to the accompanying drawings.

Figure 1:
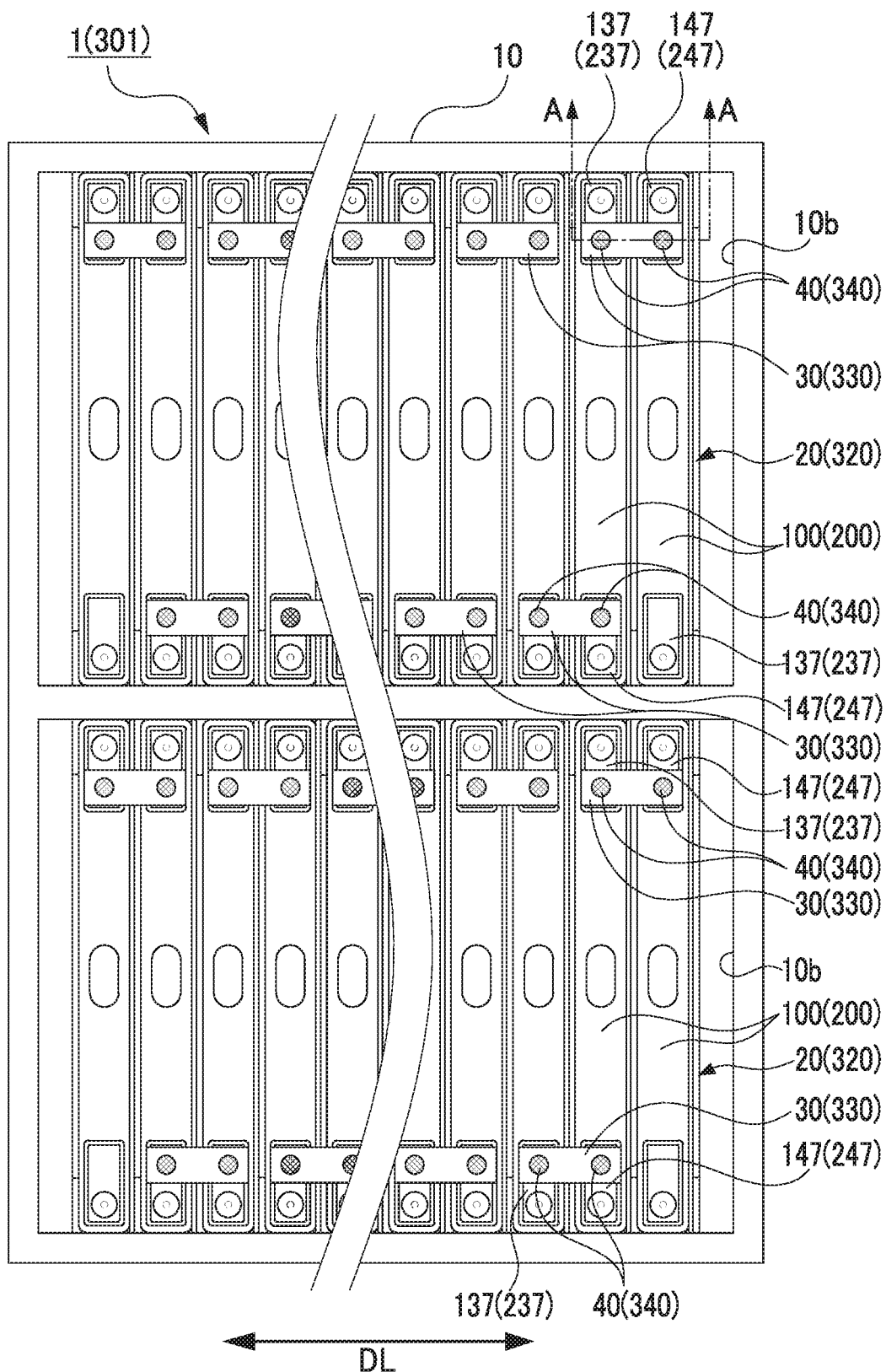
FIG. 1 is a plan view (a top view) of a battery pack in first and second examples.
Figure 2:
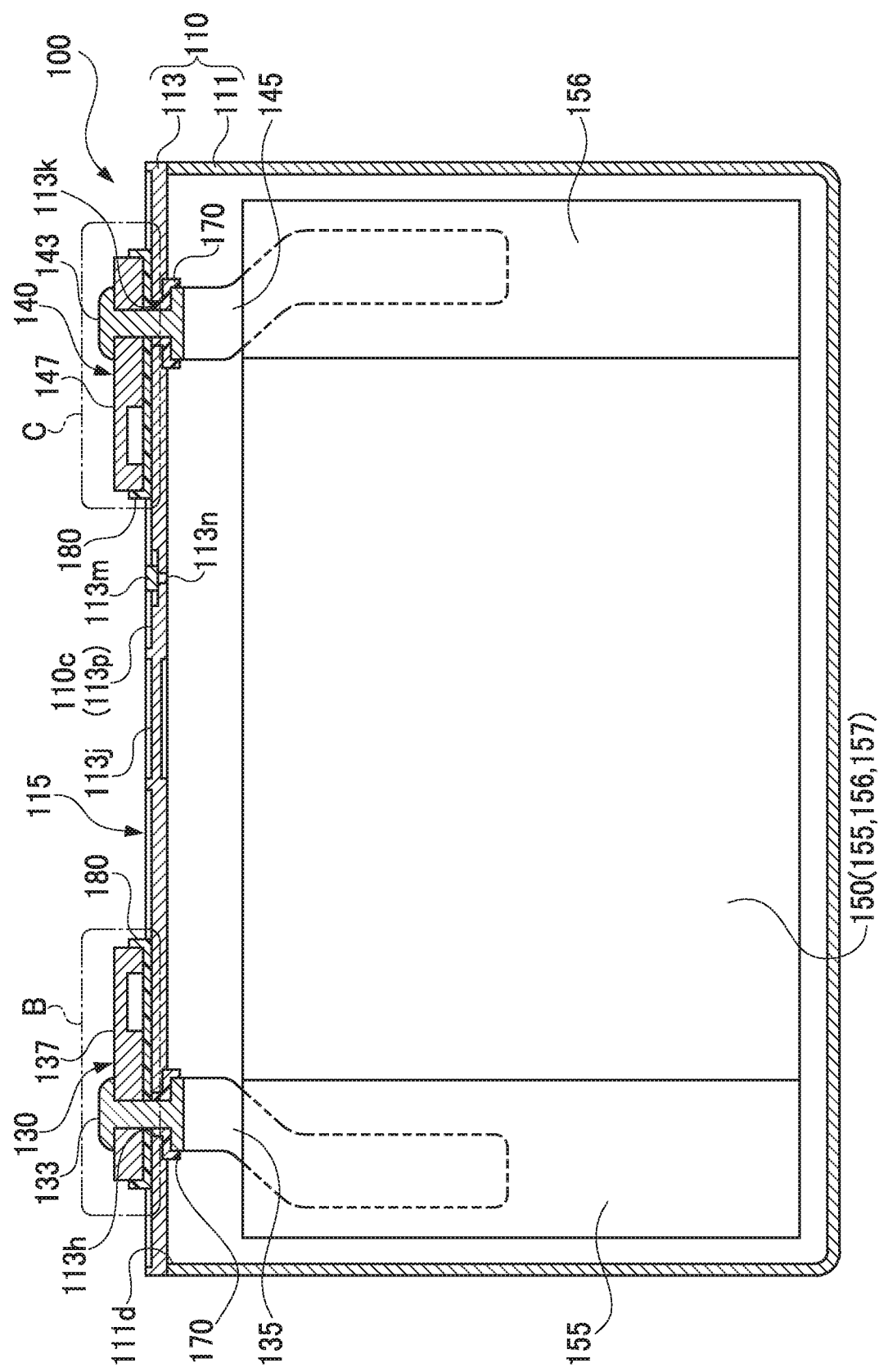
FIG. 2 is a partly sectional view of a cell in the first example.
Figure 3:
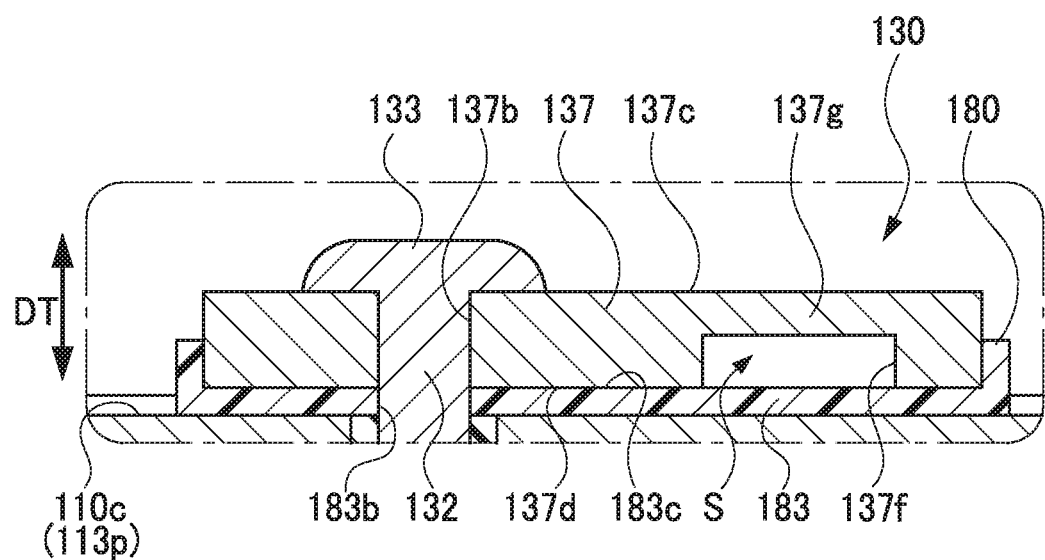
FIG. 3 is an enlarged view of a section B in FIG. 2.
Figure 4:
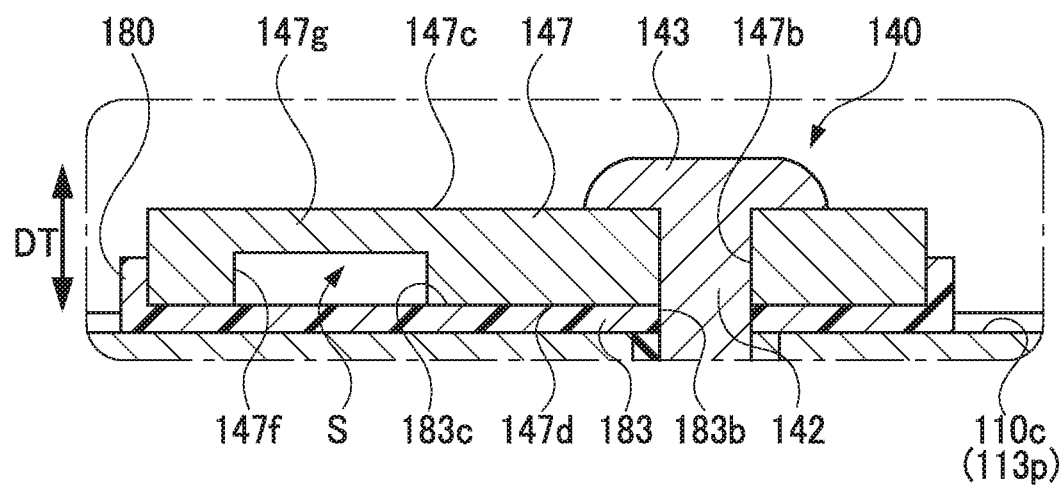
FIG. 4 is an enlarged view of a section C in FIG. 2.
Figure 5:
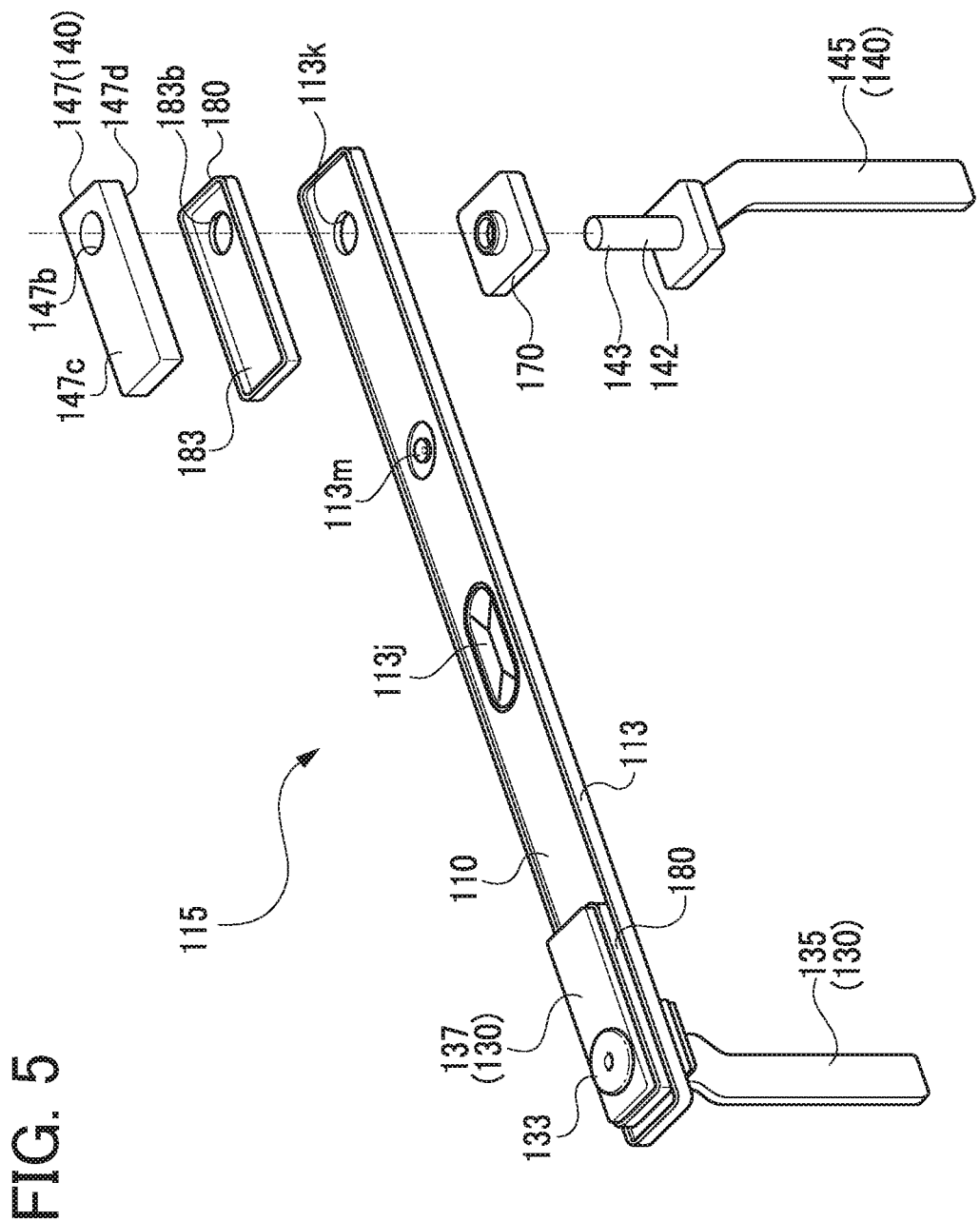
FIG. 5 is an exploded perspective view of a lid member equipped with terminals in the first example.
Figure 6:
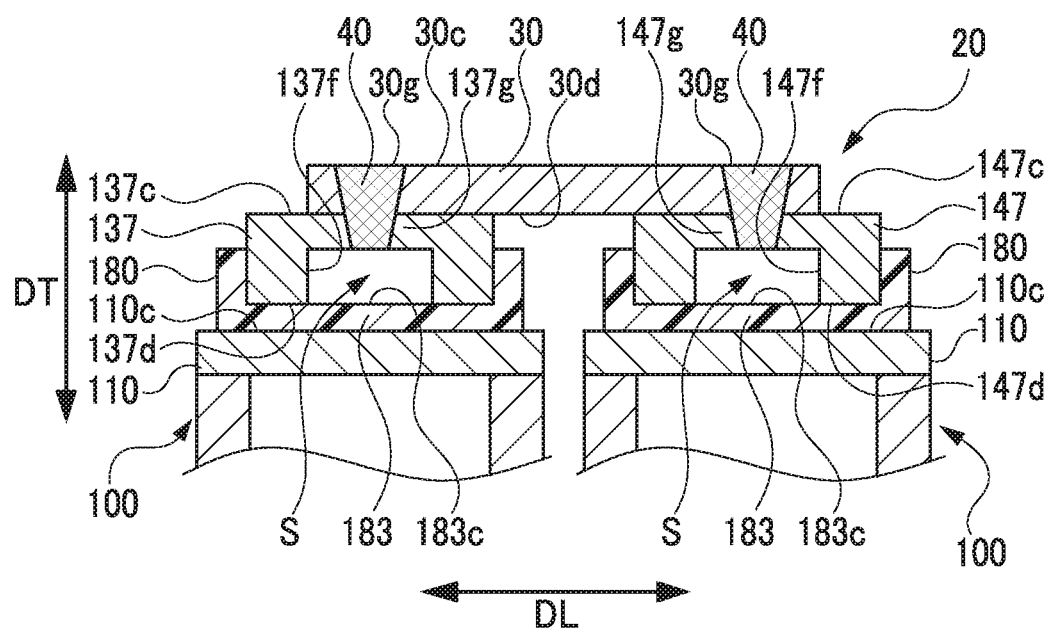
FIG. 6 is an enlarged cross-sectional view of a battery pack in the first example, taken along a line A-A in FIG. 1.

FIG. 1 is a plan view, or a top view, of a battery pack 1 in a first example. FIG. 2 is a partly sectional view of a cell 100 in the first example. FIG. 3 is an enlarged view of a section B indicated with a dashed-dotted line in FIG. 2 and FIG. 4 is an enlarged view of a section C indicated with a dashed-dotted line in FIG. 2. FIG. 5 is an exploded perspective view of a part of a lid member 115 equipped with terminals in the first example. FIG. 6 is an enlarged cross-sectional view of the battery pack 1 in the first example, taken along a line A-A in FIG. 1.

The battery pack 1 in the first example includes a plurality of cells 100 each including an external terminal (i.e., a positive external terminal 137 and a negative external terminal 147), and a plurality of bus bars 30 each made of metal in a flat plate shape, the bus bars 30 being placed on the front surfaces of the external terminals (i.e., front surfaces 137c of the positive external terminals 137 and front surfaces 147c of the negative external terminals 147) and welded to the external terminals (i.e., the positive external terminals 137 and the negative external terminals 147) (see FIGS. 1 to 6).

In the battery pack 1 in the first example, the plurality of cells 100 constitute a cell stack 20. This cell stack 20 is assembled in such a manner that the cells 100 are arranged in a row in a row direction DL (i.e., a right-left or lateral direction in FIG. 1) and housed in a housing cavity 10b of a housing case 10 (see FIG. 1). In the first example, the cell stack 20 is configured such that the cells 100 are aligned in a row by alternately reversing the orientations of the cells 100 located adjacently in the row direction DL so that the positive external terminal 137 of a cell 100 and the negative external terminal 147 of a cell 100 adjacent thereto are located side by side in the row direction DL. In the first example, the housing case 10 includes two housing cavities 10b in each of which the cell stack 20 (the plurality of cells 100 arranged in a row in the row direction DL) is housed.

In the battery pack 1 in the first example, each of the bus bars 30 connects adjacent two of the external terminals of the cells 100 arranged in the row direction DL, concretely, the positive external terminal 137 of one cell 100 and the negative external terminal 147 of an adjacent cell 100 (see FIGS. 1 to 6). To be concrete, each bus bar 30 is welded to each pair of the cells 100 located adjacently in the row direction DL in such a manner that a portion of each bus bar 30 placed on one side in the row direction DL is welded to an external terminal (e.g., a positive external terminal 137) of one cell 100 placed on the one side and a portion of each bus bar 30 placed on the other side in the row direction DL is welded to an external terminal of an adjacent cell 100 placed on the other side (e.g., a negative external terminal 147). Accordingly, the cells 100 constituting the cell stack 20 are electrically connected in series.

Each of the cells 100 in the first example is a lithium ion secondary battery including, as shown in FIG. 2, a cell case body (hereinafter, simply referred to as a case body) 111 having a rectangular box-like shape with an opening 111d and an electrode body 150 housed in the case body 111. The electrode body 150 is a wound electrode body having a flattened shape made by winding together a strip-shaped positive sheet 155, a strip-shaped negative sheet 156, and separators 157, which are in an overlapping state, into a flattened shape. Furthermore, each cell 100 is provided with a plate-shaped cell case lid (hereinafter, simply referred to as a case lid) 113 that closes the opening 111d of the case body 111. The case body 111 and the case lid 113 are welded integrally as a cell case 110.

The case lid 113 has a rectangular plate shape and is formed, at its both ends in a longitudinal direction (a right-left direction in FIG. 2), with circular through holes 113h and 113k formed through the case lid 113. The case lid 113 is further formed, at its center in the longitudinal direction, with a safety valve 113j. This safety valve 113j is integrally formed with the case lid 113 and constitutes a part of the case lid 113. In the case lid 113, between the safety valve 113j and the through hole 113k, a liquid inlet 113n for injection of an electrolyte (not shown) into the cell case 110 is formed (see FIG. 2). This liquid inlet 113n is closed with an inlet plug 113m.

Each of the cells 100 is further provided with electrode terminal members (that is, a positive terminal member 130 and a negative terminal member 140) each connected with the electrode body 150 inside the case body 111 and extending out through the corresponding through holes 113*h* and 113*k* of the case lid 113 (see FIG. 2). The positive terminal member 130 is constituted of a positive connecting member 135 and a positive external terminal 137. This positive connecting member 135 is made of metal and connected to the positive electrode sheet 155 of the electrode body 150 and also extends out through the through hole 113*h* of the case lid 113.

Figure 7:
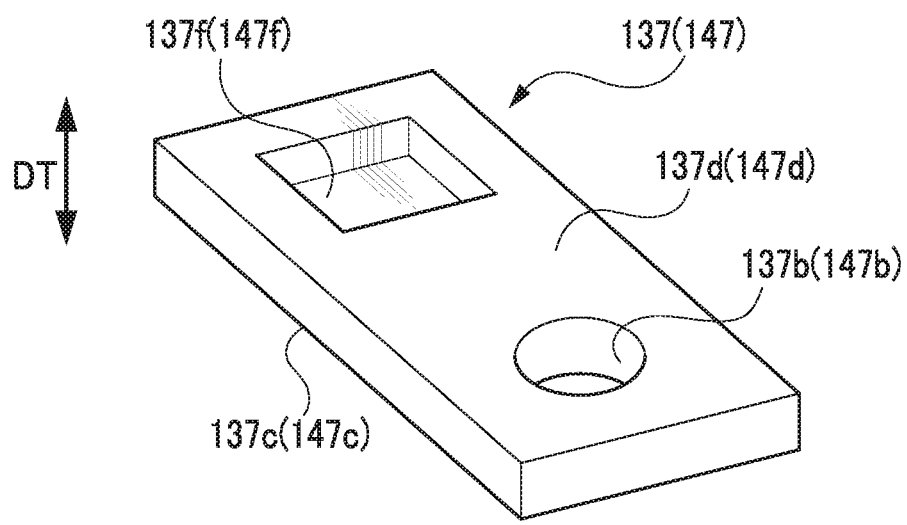
FIG. 7 is a perspective view of an external terminal in the first example.

The positive external terminal 137 is made of metal in a rectangular flat plate shape (see FIGS. 3, 6, and 7). This positive external terminal 137 has a cylindrical through hole 137*b* penetrating through the positive external terminal 137 in its thickness direction DT. The positive external terminal 137 further includes a terminal recess 137*f* that opens in a back surface 137*d* of the positive external terminal 137, i.e., opens on a lower side in FIGS. 3 and 6 and an upper side in FIG. 7. This terminal recess 137*f* includes an opening having a rectangular shape in a planar view and is recessed in a direction away from a front surface 183*c* of an insulating part 183, the front surface 183*c* facing the back surface 137*d* of the positive external terminal 137, i.e., the terminal recess 137*f* is recessed upward in FIGS. 3 and 6. FIG. 7 is a perspective view of the external terminal (i.e., the positive terminal member 130 and the negative terminal member 140) in the first example.

The positive external terminal 137 configured as above is placed on the case lid 113 (i.e., on the outside of the cell case 110) and is electrically connected to the positive connecting member 135 on the outside of the cell case 110. To be concrete, a swaged portion 133 of the positive connecting member 135 is in tight contact with a front surface 137*c* of the positive external terminal 137, thereby enabling electrical connection to the positive external terminal 137 (see FIG. 3). In particular, the cylindrical swaged portion 133 protruding out, or upward, from the through hole 137*b* of the positive external terminal 137 is swaged and deformed into a circular disk-like shape on the outside of the cell case 110, that is, depressed to widen its diameter, to tightly contact with the front surface 137*c* of the positive external terminal 137, thereby enabling electrical connection to the positive external terminal 137.

The negative terminal member 140 is constituted of the negative connecting member 145 and the negative external terminal 147. This negative connecting member 145 is made of metal and connected to the negative electrode sheet 156 of the electrode body 150, and further extends outward through the through hole 113*h* of the case lid 113.

The negative external terminal 147 is made of metal in a rectangular flat plate shape (see FIGS. 4, 6, and 7). This negative external terminal 147 has a cylindrical through hole 147*b* penetrating through the negative external terminal 147 in its thickness direction DT. The negative external terminal 147 further includes a terminal recess 147*f* that opens in a back surface 147*d* of the negative external terminal 147, i.e., on a lower side in FIGS. 4 and 6 and an upper side in FIG. 7. This terminal recess 147*f* includes an opening having a rectangular shape in a planar view and is recessed in a direction away from the front surface 183*c* of the insulating part 183, the front surface 183*c* facing the back surface 147*d* of the negative external terminal 147, i.e., the terminal recess 147*f* is recessed upward in FIGS. 4 and 6.

The negative external terminal 147 configured as above is placed on the case lid 113 (i.e., on the outside of the cell case 110) and is electrically connected to the negative connecting member 145 on the outside of the cell case 110. To be concrete, a swaged portion 143 of the negative connecting member 145 is in tight contact with a front surface 147*c* of the negative external terminal 147, thereby enabling electrical connection to the negative external terminal 147 (see FIG. 4). In particular, the cylindrical swaged portion 143 protruding out, or upward, from the through hole 147*b* of the negative external terminal 147 is swaged and deformed into a circular disk-like shape on the outside of the cell case 110, that is, depressed to widen its diameter, to tightly contact with the front surface 147*c* of the negative external terminal 147, thereby enabling electrical connection to the negative external terminal 147.

Furthermore, each cell 100 includes a pair of first insulators 180 each made of resin having an electrically insulation property and placed on the case lid 113. One of the first insulators 180 includes an insulating part 183 interposed between the front surface 110*c* of the cell case 110 (i.e., the front surface 113*p* of the case lid 113) and the back surface 137*d* of the positive external terminal 137 to provide electrical insulation therebetween (see FIG. 3). The other first insulator 180 includes an insulating part 183 interposed between the front surface 110*c* of the cell case 110 (i.e., the front surface 113*p* of the case lid 113) and the back surface 147*d* of the negative external terminal 147 to provide electrical insulation therebetween (FIG. 4). Those insulating parts 183 are each formed with a through hole 183*b* penetrating therethrough, in which an insertion part 132 of the positive terminal member 130 or an insertion part 142 of the negative terminal member 140 is inserted.

Each cell 100 further includes a pair of second insulators 170 each interposed between the negative connecting member 145 of the negative terminal member 140 and the back surface of the case lid 113 to provide electrical insulation therebetween (see FIGS. 2 and 5). In each cell 100, the other second insulator 170 is also placed between the positive connecting member 135 of the positive terminal member 130 and the back surface of the case lid 113.

Moreover, the battery pack 1 in the first example includes a welded portion 40 at which the external terminal (i.e., the positive external terminal 137 or the negative external terminal 147) and the bus bar 30 are welded together (see FIGS. 1 and 6). To be concrete, the battery pack 1 includes the welded portion 40 formed by welding a portion of the bus bar 30, placed on one side in the row direction DL, that is, in the right-left direction in FIGS. 1 and 6, and the external terminal (e.g., the positive external terminal 137) of the cell 100 and the welded portion 40 formed by welding a portion of the bus bar 30, placed on the other side in the row direction DL and the external terminal (e.g., the negative external terminal 147) of the cell 100. Those welded portions 40 are each configured to extend in the thickness direction DT (i.e., an up-down direction in FIG. 6) of the external terminal (i.e., the positive external terminal 137 or the negative external terminal 147) from the front surface 30*c* of the bus bar 30 toward the back surface 137*d* or 147*d* of the external terminal (i.e., the positive external terminal 137 or the negative external terminal 147).

Meanwhile, in the battery pack 1 in the first example, as described above, the external terminal, that is, the positive external terminal 137 or the negative external terminal 147, includes the terminal recess 137*f* or 147*f* that opens in the back surface 137*d* or 147*d*, i.e., opens downward in FIGS. 3, 4, and 6, and that is recessed in a direction away from the front surface 183*c* of the insulating part 183, i.e., recessed upward in FIGS. 3, 4, and 6. In the battery pack 1 (each cell 100) in the first example, furthermore, the openings of the terminal recess 137*f* and 147*f* are closed with the front surfaces 183c of the corresponding insulating parts 183, thereby forming respective spaces S (enclosed spaces) (see FIGS. 3, 4, and 6).

In the battery pack 1 in the first example, as shown in FIG. 6, each foregoing welded portion 40 is located apart from the corresponding insulating part 183 by the space S intervening between the welded portion 40 and the insulating part 183 in the thickness direction DT (i.e., in the up-down direction in FIG. 6) of the external terminal, i.e., the positive external terminal 137 and the negative external terminal 147. In other words, the space S intervenes between the welded portion 40 and the insulating part 183 in the thickness direction DT of the external terminals, i.e., the positive external terminal 137 and the negative external terminal 147. This thickness direction DT of the external terminals, i.e., the positive external terminal 137 and the negative external terminal 147, indicates a direction straight from the front surfaces 137c and 147c of the external terminals (i.e., the positive external terminal 137 and the negative external terminal 147) toward the back surfaces 137d and 147d. This thickness direction DT is also a direction perpendicular to the front surfaces 137c and 147c or the back surfaces 137d and 147d.

The battery pack 1 configured as above is a battery pack including the insulating part 183 that can be prevented from lowering in electrical insulation property under the influence of the heat generated by welding the external terminal (i.e., the positive external terminal 137 or the negative external terminal 147) and the bus bar 30, thus ensuring electrical insulation between the cell case 110 and the external terminal (i.e., the positive external terminal 137 or the negative external terminal 147).

Specifically, in the step of welding the external terminal (i.e., the positive external terminal 137 or the negative external terminal 147) to the bus bar 30, that is, in a laser welding step mentioned later (step S4), when a part of the bus bar 30, corresponding to a portion which becomes the welded portion 40, and a part of the external terminal (the positive external terminal 137 or the negative external terminal 147), corresponding to a portion which becomes the welded portion 40, are melted together, the space S intervenes between the molten metal portion 41 (i.e., the molten metal portion 41 formed of the melted bus bar 30 or the melted external terminal) and the insulating part 183 in the thickness direction DT of the external terminal (the positive external terminal 137 or the negative external terminal 147). Thus, the heat of the molten metal portion 41 is less likely to conduct to the insulating part 183 (see FIG. 11). This configuration can prevent the electrical insulation property of the insulating part 183 from lowering under the influence of the heat generated by welding and hence ensure electrical insulation between the cell case 110 and the external terminal (the positive external terminal 137 or the negative external terminal 147).

In the battery pack 1 in the first example, furthermore, the external terminal (the positive external terminal 137 or the negative external terminal 147) includes a portion (referred to as a separated portion 137g or 147g) located apart from the insulating part 183 by the space S intervening therebetween in the thickness direction DT, i.e., in the up-down direction in FIGS. 3, 4, and 6 (see FIGS. 3, 4, and 6). The bus bar 30 includes a portion (referred to a s an opposed portion 30g) opposed to the space S via the separated portion 137g or 147g intervening in the thickness direction DT of the external terminal (the positive external terminal 137 or the negative external terminal 147) (see FIGS. 6 and 9).

The welded portion 40 is configured as a welded portion at which the opposed portion 30g and the separated portion 137g or 147g are welded together such that the welded portion extends from the front surface (the upper surface in FIGS. 6 and 11) of the opposed portion 30g of the bus bar 30 to the back surface (the lower surface in FIGS. 6 and 11) of the separated portion 137g or 147g of the external terminal (the positive external terminal 137 or the negative external terminal 147). Such a battery pack 1 is a battery pack with reduced voids in the welded portions 40. The battery pack 1 in the first example is therefore a battery pack in which the welded portions 40 are high in strength and also high in electrical conductivity; thus, the connection resistance between the bus bar 30 and the positive external terminal 137 is small and the connection resistance between the bus bar 30 and the negative external terminal 147 is small.

Specifically, the welded portion 40 extending from the front surface (the upper surface in FIGS. 6 and 11) of the opposed portion 30g of the bus bar 30 to the back surface (the lower surface in FIGS. 6 and 11) of the separated portion 137g or 147g of the external terminal (the positive external terminal 137 or the negative external terminal 147) is made by penetration laser welding as mentioned later in which the molten metal portion 41 (a melted portion of the metal constituting the opposed portion 30g of the bus bar 30 or a melted portion of the metal constituting the separated portion 137g or 147g of the external terminal) melted by irradiation of the laser beam LB extends from the front surface 30c of the bus bar 30 (i.e., the front surface of the opposed portion 30g) to the space S (see FIGS. 6 and 11).

The above penetration laser welding configured to cause the molten metal portion 41 to reach the space S can release or eliminate at least a part of gas (air bubbles) contained in the molten metal portion 41 into the space S. Thus, voids (i.e., micro-voids to be formed by air bubbles) which may be generated in the welded portion 40 are reduced and hence the strength of the welded portion 40 can be enhanced, and also the electrical conductivity of the welded portion 40 can be enhanced; thus, the connection resistance between the bus bar 30 and the positive external terminal 137 can be decreased and also the connection resistance between the bus bar 30 and the negative external terminal 147 can be decreased.

In addition, such a space S formed as an enclosed space as described above can accommodate or collect at least a part of foreign substances, such as spatters, generated during laser welding. Accordingly, the amount of foreign substances, such as spatters, dispersed outward can be reduced, leading to lowering of pollution in external environment.

Figure 8:
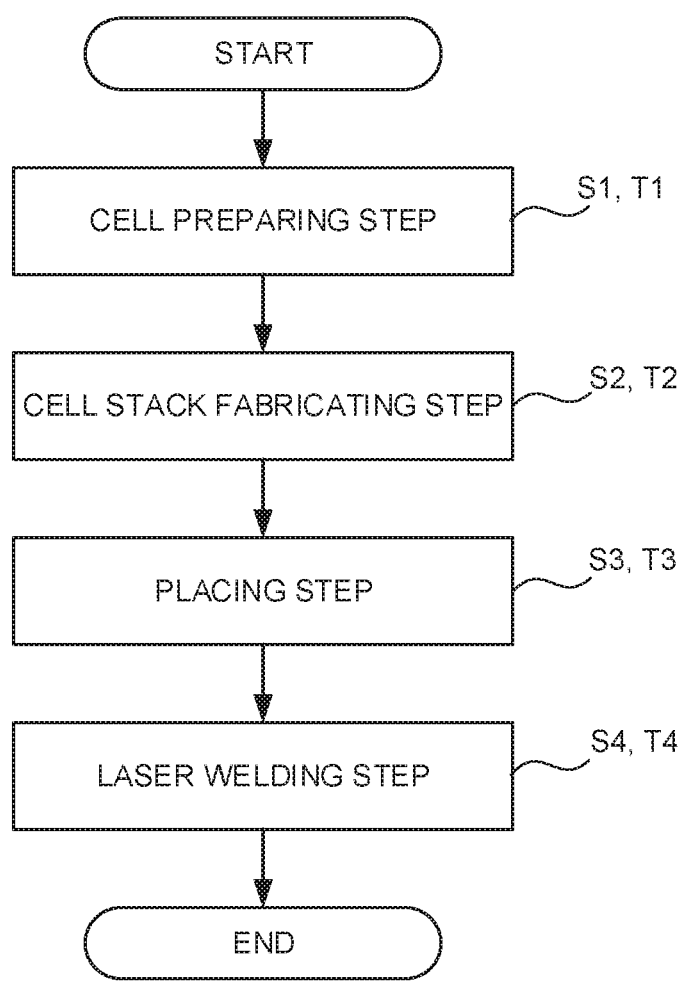
FIG. 8 is a flowchart showing a process flow of a manufacturing method of the battery pack in first and second examples.

The manufacturing method of the battery pack 1 in the first example will be described below. FIG. 8 is a flowchart showing a process flow of the manufacturing method of the battery pack 1 in the first example. In step S1 (a cell preparing step), firstly, a plurality of cells 100 are prepared; that is, a plurality of cells 100 in each of which the bus bars 30 are not yet welded to the positive external terminals 137 and the negative external terminals 147 (see FIG. 2).

More specifically, in step S1 (the cell preparing step), a plurality of cells 100 provided with external terminals (the positive external terminals 137 and the negative external terminals 147) including the separated portions 137g and 147g located apart from the insulating parts 183 by the spaces S intervening between the external terminals and the insulating parts 183 in the thickness direction DT of the external terminals (the positive external terminal 137 and the negative external terminal 147) are prepared (see FIGS. 3 and 4). In each cell 100 in the first example, each space S is configured as an enclosed space defined by the terminal recess 137*f* of the positive external terminal 137 and the front surface 183*c* of one insulating part 183 that closes the opening of the terminal recess 137*f* or defined by the terminal recess 147*f* of the negative external terminal 147 and the front surface 183*c* of the other insulating part 183 that closes the opening of the terminal recess 147*f*.

In step S2 (a cell stack fabricating step, see FIG. 8), successively, the predetermined number of the prepared cells 100 are disposed in a row in the row direction DL (in the right-left direction in FIG. 1) to fabricate a cell stack 20. In the first example, more concretely, the cell stack 20 is fabricated in such a configuration that the cells 100 are arranged in a row by alternately reversing the orientations of the cells 100 located adjacently in the row direction DL so that the positive external terminal 137 of a cell 100 and the external terminal 147 of a cell 100 adjacent thereto in the row direction DL are located side by side (see FIG. 1).

The cell stack 20 is then housed in the housing cavity 10*b* of the housing case 10. In the first example, a cooling plate is interposed between the cells 100 adjacently arranged in the row direction DL. Further, end plates are disposed one by one on both ends of the cell stack 20 in the row direction DL. The housing case 10 is provided with two housing cavities 10*b*. In the first example, accordingly, two sets of the cell stacks 20 (each including a plurality of cells 100 arranged in a row in the row direction DL) are housed one by one in the housing cavities 10*b* (see FIG. 1).

Figure 9:
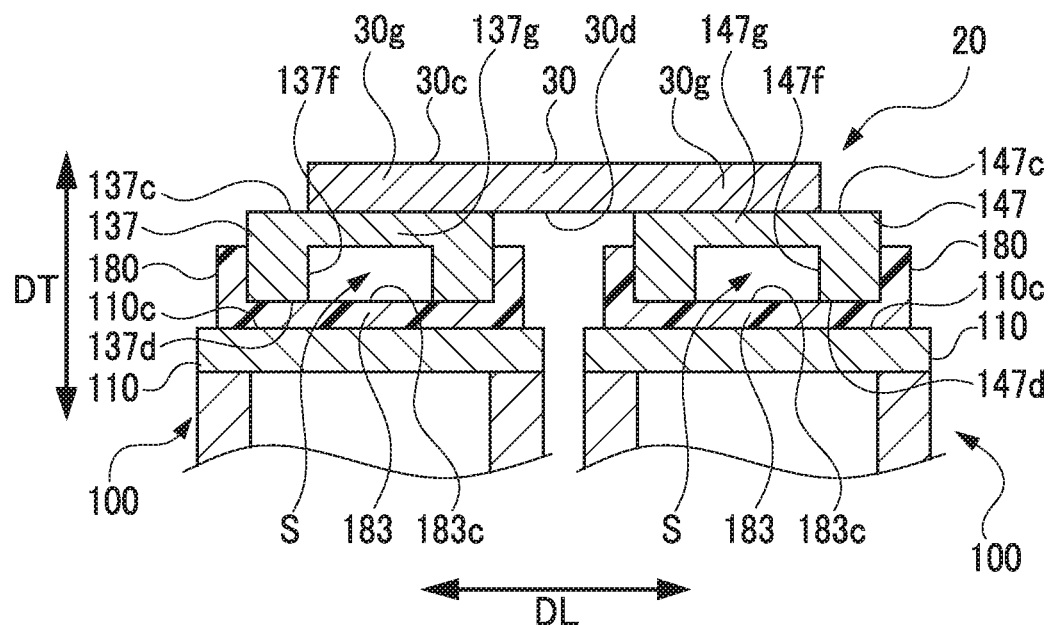
FIG. 9 is an explanatory diagram for a placing step in the first example.

Subsequently, in step S3 (a placing step, see FIG. 8), as shown in FIG. 9, for each of the cell stacks 20, each bus bar 30 is placed over adjacent two of the front surfaces of the external terminals of the cells 100 adjacently arranged in the row direction DL, that is, each bus bar 30 is disposed on the front surface 137*c* of the positive external terminal 137 of a cell 100 and the front surface 147*c* of the negative external terminal 147 of a cell 100 next thereto. To be specific, a part of the bus bar 30 placed on the one side in the row direction DL (a left side in FIG. 9) is placed on the front surface of the external terminal (i.e., on the front surface 137*c* of the positive external terminal 137 in the example shown in FIG. 9) of the one-side cell 100 of two cells 100 adjacently arranged in the row direction DL and also a part of the bus bar 30 located on the other side in the row direction DL (a right side in FIG. 9) is placed on the front surface of the external terminal (i.e., on the front surface 147*c* of the negative external terminal 147 in the example shown in FIG. 9) of the other-side cell 100.

In step S3 (the placing step), however, the bus bar 30 is placed on and across the front surface 137*c* of the positive external terminal 137 and the front surface 147*c* of the negative external terminal 147 adjacent thereto such that a part of the bus bar 30 (i.e., a portion located on each end in the row direction DL) becomes the opposed portion 30*g* opposed to the space S via the separated portion 137*g* or 147*g* of the external terminal in the thickness direction DT (in the up-down direction in FIG. 9) of the external terminal (the positive external terminal 137 or the negative external terminal 147). FIG. 9 is a cross-sectional view showing two cells 100 shown in FIG. 6, that is, two cells 100 taken along a line A-A in FIG. 1, which are subjected to the step S3 (the placing step).

Subsequently, in step S4 (a laser welding step), the opposed portions 30*g* of the bus bars 30 are welded by laser to the corresponding separated portions 137*g* and 147*g* of the external terminals (i.e., the positive external terminal 137 and the negative external terminal 147) (see FIG. 10). To be concrete, the opposed portion 30*g* of the bus bar 30, located on one side (a left side in FIG. 10) in the row direction DL, is welded to the separated portion of the external terminal (the separated portion 137*g* of the positive external terminal 137 in the example shown in FIG. 10) of the one-side cell 100 of two cells 100 adjacently arranged in the row direction DL, while the opposed portion 30*g* of the bus bar 30, located on the other side (a right side in FIG. 10) in the row direction DL, is welded to the separated portion of the external terminal (the separated portion 147*g* of the negative external terminal 147 in the example shown in FIG. 10) of the other-side cell 100.

Figure 10:
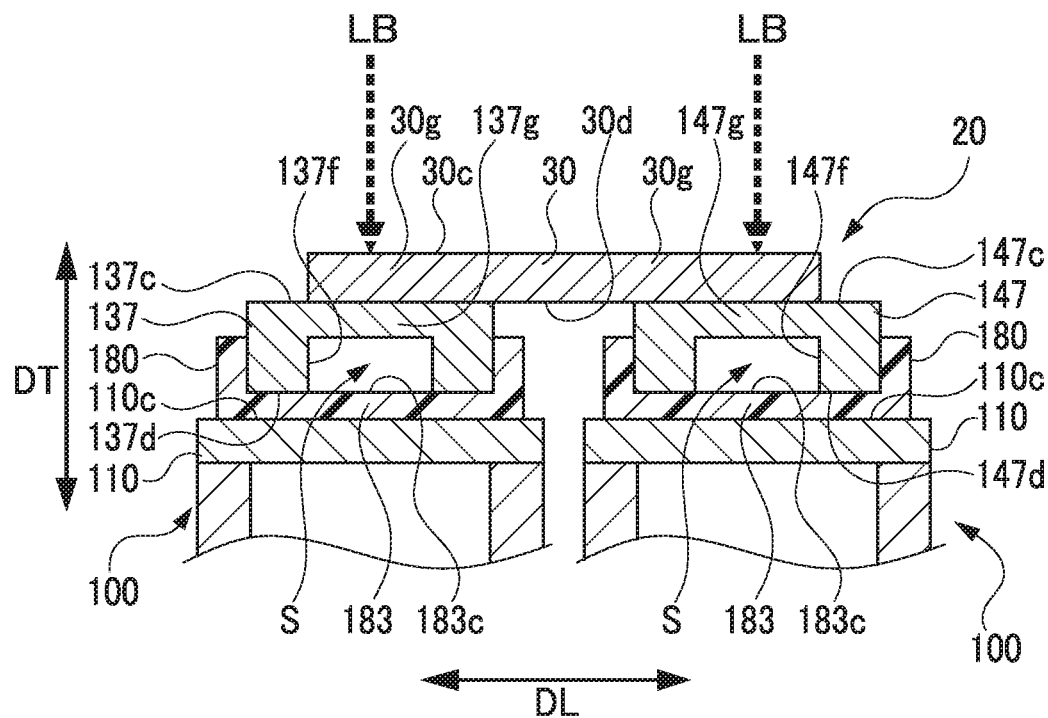
FIG. 10 is an explanatory diagram for a laser welding step in the first example.

In this step S4 (the laser welding step), the laser beam LB is irradiated in the thickness direction DT (downward in FIG. 10) of the external terminals (the positive external terminal 137 and the negative external terminal 147) from the side of (i.e., from a position distant from) the front surface 30*c* of the bus bar 30 (the opposed portion 30*g*), that is, from above the bus bar 30 in FIG. 10, toward the space S. In other words, the laser beam LB is irradiated in the thickness direction DT onto the front surface 30*c* of the bus bar 30 (the opposed portion 30*g*) toward the space S. This laser irradiation melts the opposed portion 30*g* of the bus bar 30 and the separated portions 137*g* and 147*g* of the external terminals (the positive external terminal 137 and the negative external terminal 147), thus forming the welded portions 40 at each of which the opposed portion 30 and the separated portion 137*g* or 147*g* are welded together (see FIGS. 6, 10, and 11).

Figure 11:
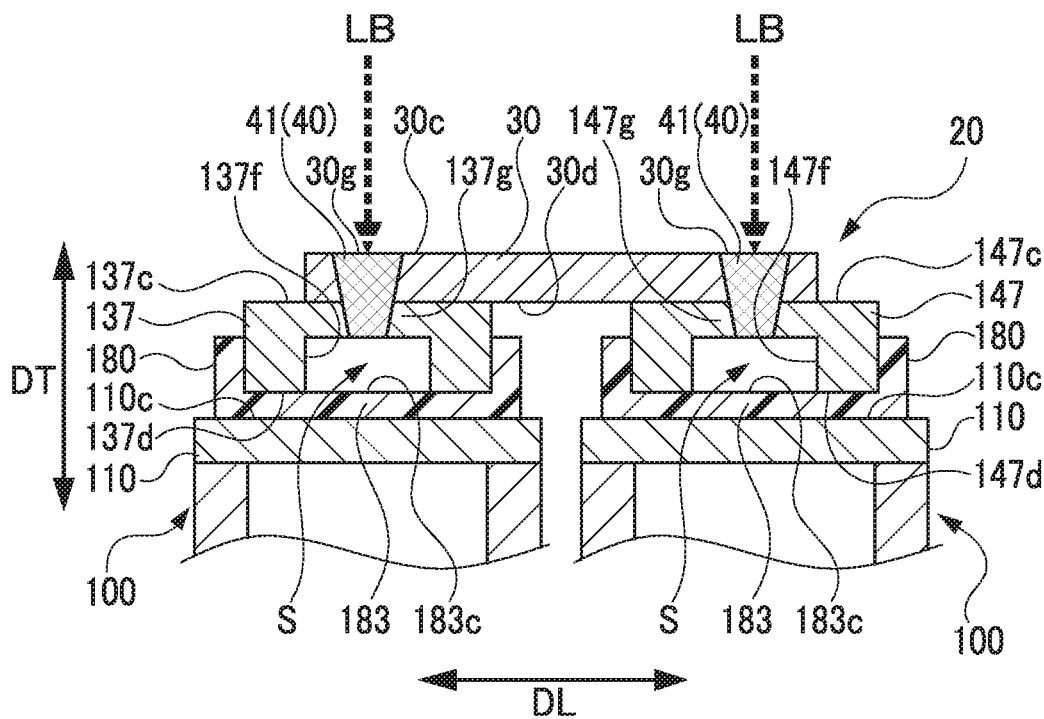
FIG. 11 is another explanatory diagram for the laser welding step in the first example.

To be concrete, each welded portion 40 is formed as a welded portion configured to extend in the thickness direction DT of the external terminal (i.e., the positive external terminal 137 and the negative external terminal 147) from the front surface 30*c* of the bus bar 30 toward the back surface of the external terminal (i.e., the back surface 137*d* of the positive external terminal 137 or the back surface 147*d* of the negative external terminal 147) and also configured to be located apart from the insulating part 183 by the space S intervening therebetween in the thickness direction DT of the external terminal, that is, configured such that the space S intervenes between the welded portion 40 and the insulating part 183 in the thickness direction DT of the external terminal (see FIGS. 6 and 11). FIGS. 10 and 11 are cross-sectional views each showing the states of two cells 100 shown in FIG. 6, i.e., two cells 100 taken along a line A-A in FIG. 1, in the course of step S4 (the laser welding step).

By step S4 (the laser welding step) performed as above, the heat generated in the external terminals (i.e., the positive external terminal 137 and the negative external terminal 147) and others during laser welding is less likely to conduct to the insulating part 183 made of resin. Specifically, in step S4 (the laser welding step), the space S intervenes between the molten metal portion 41 (i.e., the molten metal portion 41 made of the melted opposed portion 30*g* of the bus bar 30 or the melted separated portion 137*g* or 147*g* of the external terminal) and the insulating part 183 in the thickness direction DT of the external terminals (the positive external terminal 137 and the negative external terminal 147), so that the heat of the molten metal portion 41 is less likely to conduct to the insulating part 183 (see FIG. 11). Accordingly, the electrical insulation property of the insulating part 183 is prevented from lowering under the influence of the heat generated by laser welding, thereby ensuring electrical insulation between the cell case 110 and the external terminal (i.e., the positive external terminal 137 and the negative external terminal 147).

A concrete example that the electrical insulation property of the insulating part 183 declines under the influence of the heat generated during laser welding may include for example a case where the insulating part 183 is deformed by the heat generated during laser welding and thus the insulating part 183 partly decreases in thickness or alternatively the insulating part 183 is partly formed with a pore(s) or hole(s), resulting in deterioration of the electrical insulation property of the insulating part 183. Another case is also conceivable in which, when the insulating part 183 is exposed to the heat generated during laser welding, the insulating part 183 is partly carbonized and thus the electrical resistivity of such a carbonized portion lowers, that is, its electrical conductivity rises, resulting in deterioration of the electrical insulation property of the insulating part 183.

In step S4 (the laser welding step) in the first example, however, the laser welding is performed by the penetration laser welding to cause the molten metal portion 40 (i.e., the melted portion of the metal constituting the opposed portion 30g of the bus bar 30 or the melted portion of the metal constituting the separated portions 137g and 147g of the external terminals) melted by irradiation of the laser beam LB to extend from the front surface 30c of the bus bar 30 (i.e., the front surface of the opposed portion 30g) and reach the space S as shown in FIG. 11. Accordingly, the welded portion 40 is formed to extend from the front surface of the opposed portion 30g of the bus bar 30 (i.e., the upper surface in FIGS. 6 and 11) to the back surface of the separated portion 137g or 147g (i.e., the lower surface in FIGS. 6 and 11) of the external terminal (i.e., the positive external terminal 137 or the negative external terminal 147).

The penetration laser welding performed as above to make the molten metal portion 41 reach the space S enables at least a part of gas (air bubbles) contained in the molten metal portion 41 to be released into the space S. This process can reduce voids which may be generated in the welded portion 40, and thus enhance the strength of the welded portion 40. Further, this process can also enhance the electrical conductivity of the welded portion 40 and hence decrease the connection resistance between the bus bar 30 and the positive external terminal 137 and the connection resistance between the bus bar 30 and the negative external terminal 147.

In the first example, additionally, as described above, each of the spaces S is the enclosed space defined by the terminal recess 137f of the positive external terminal 137 and the front surface 183c of the insulating part 183 that closes the opening of the terminal recess 137f or defined by the terminal recess 147f of the negative external terminal 147 and the front surface 183c of the other insulating part 183 that closes the opening of the terminal recess 147f (see FIG. 11). Those spaces allow accommodation or collection of at least a part of foreign substances, such as spatters, generated during laser welding. In step S4 (the laser welding step), accordingly, the amount of foreign substances such as spatters dispersed outside can be reduced, leading to lowering pollution in external environment.

Since the bus bar 30 is welded to the external terminals (the positive external terminal 137 and the adjacent negative external terminal 147) of the cells 100 adjacently arranged in the row direction DL as described above, the adjacent cells 100 in the row direction DL are electrically connected in series through the bus bar 30. Accordingly, a plurality of cells 100 constituting the cell stack 20 are electrically connected in series. As described above, a battery pack 1 in the first example is manufactured.

Second Example

A battery pack 301 in the second example is different from the battery pack 1 in the first example in the shape of external terminals (a positive external terminal and a negative external terminal) of a cell and the shape of a bus bar, but other components or parts are identical to those of the battery pack 1 in the first example. Thus, the following explanation is made with a focus on differences from the first example and the identical or similar configurations are not elaborated upon here.

A cell 200 constituting a battery pack 301 in the second example is different from the cell 100 in the first example only in the external terminals (the positive external terminal and the negative external terminal), but other components or parts are identical or similar to those of the cell 100. Specifically, a positive external terminal 237 in the second example includes a terminal protruding portion 237h protruding from a front surface 237c, i.e., protruding on the side on which a bus bar 330 is placed, corresponding to the upper side in FIGS. 12 and 13. The positive external terminal 237 further includes a terminal recess 237f that is positioned on an opposite side (i.e., on a lower side in FIGS. 12 and 13) of the terminal protruding portion 237h, and that opens in a back surface 237d of the positive external terminal 237, i.e., that has an opening on a lower side in FIGS. 12 and 13. This terminal recess 237f is recessed from the back surface 237d toward the front surface 237c of the positive external terminal 237. Those terminal protruding portion 237h and terminal recess 237f each have an approximately hemisphere face.

Figure 12:
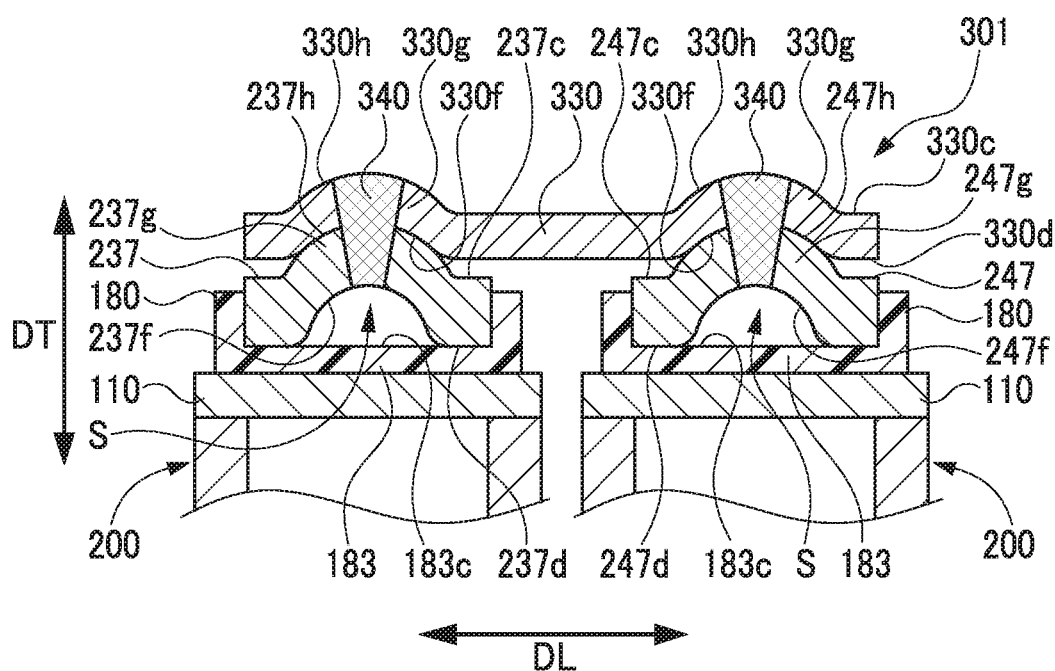
FIG. 12 is an enlarged cross-sectional view of a battery pack in the second example, taken along the line A-A in FIG. 1.
Figure 13:
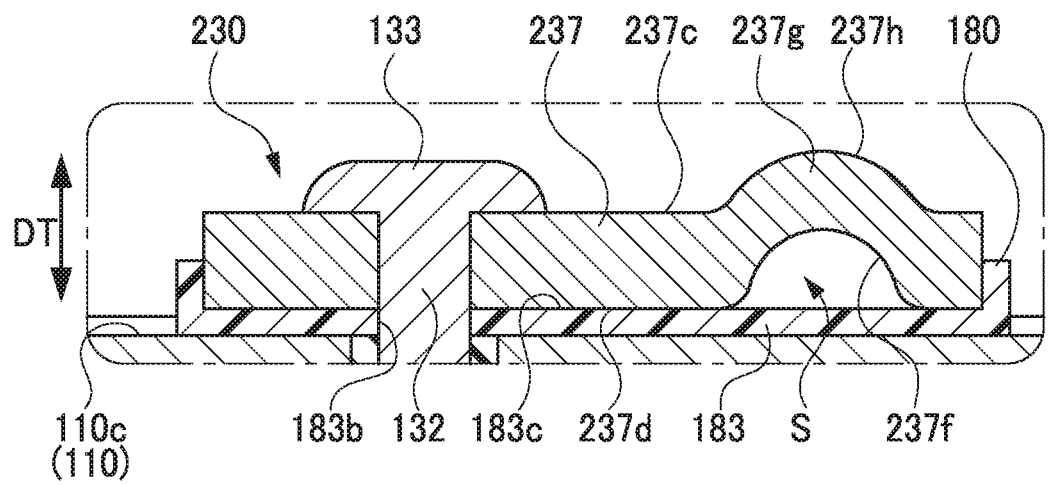
FIG. 13 is an enlarged cross-sectional view of a cell in the second example, corresponding to an enlarged view of the section B in FIG. 2.
Figure 14:
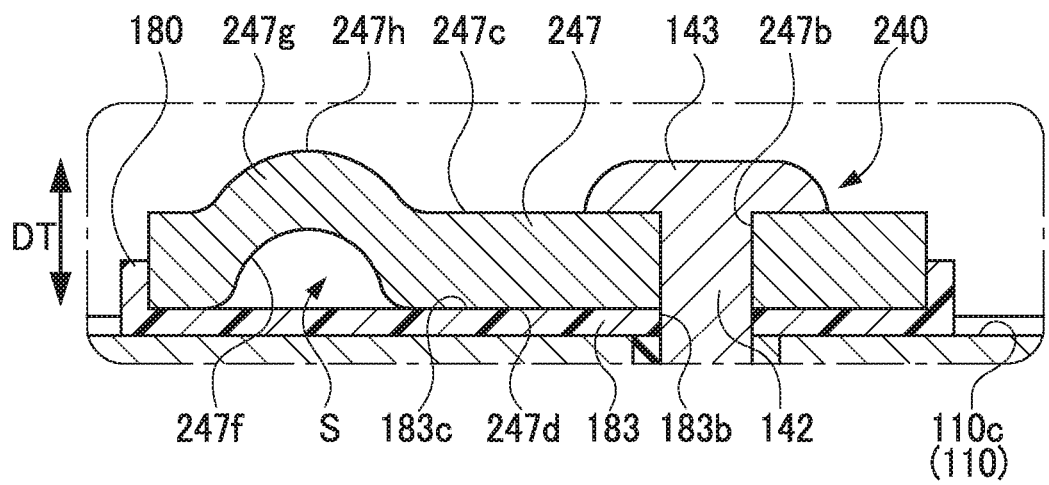
FIG. 14 is an an enlarged cross-sectional view of a cell in the second example, corresponding to an enlarged view of the section C in FIG. 2.

FIG. 12 is an A-A cross-sectional enlarged view of the battery pack 301 in the second example, taken along a line A-A in FIG. 1. FIG. 13 is an enlarged cross-sectional view of the cell 200 in the second example, corresponding to an enlarged view of a section B in FIG. 2. FIG. 14 is an enlarged cross-sectional view of the cell 200 in the second example, corresponding to an enlarged view of a section C in FIG. 2.

In the second example, the terminal protruding portion 237h of the positive external terminal 237 is formed in such a manner that a rectangular flat plate-shaped positive external terminal (a substrate) is subjected to press work. When this rectangular flat plate-shaped positive external terminal (the substrate) is pressed, the terminal protruding portion 237h is formed to protrude from the front surface 237c and simultaneously the terminal recess 237f is formed to open in the back surface 237d, that is, to be recessed from the back surface 237d toward the front surface 237c.

In the battery pack 301 (the cell 200) in the second example, the opening of the terminal recess 237f is closed with the front surface 183c of the insulating part 183, thereby forming a space S (an enclosed space) (see FIGS. 12 and 13). Further, the terminal protruding portion 237h of the positive external terminal 237 is a part (a front surface part) of a separated portion 237g located apart from the insulating part 183 by the space S intervening therebetween in the thickness direction DT of the positive external terminal 237, i.e., in the up-down direction in FIGS. 12 and 13.

The negative external terminal 247 in the second example is identical in shape to the foregoing positive external terminal 237. Specifically, the negative external terminal 247 includes a terminal protruding portion 247h protruding from a front surface 247c, i.e., protruding on the side on which the bus bar 330 is placed, corresponding to the upper side in FIGS. 12 and 14, and a terminal recess 247f positioned on an opposite side (i.e., on a lower side in FIGS. 12 and 14) of the terminal protruding portion 247h. The terminal protruding portion 247h and the terminal recess 247f of the negative external terminal 247 are also formed by press work in a similar manner to the positive external terminal 237.

In the battery pack 301 (the cell 200) in the second example, the opening of the terminal recess 247*f* is closed with the front surface 183*c* of the insulating part 183, thereby forming a space S (an enclosed space) (see FIGS. 12 and 14). Further, the terminal protruding portion 247*h* of the negative external terminal 247 is a part (a front surface part) of a separated portion 247*g* located apart from the insulating part 183 by the space S intervening therebetween in the thickness direction DT of the negative external terminal 247, i.e., in the up-down direction in FIGS. 12 and 14.

Each bus bar 330 in the second example includes a concave bus-bar recess 330*f* allowing the terminal protruding portion 237*h* of the positive external terminal 237 to be fitted therein and a concave bus-bar recess 330 allowing the terminal protruding portion 247*h* of the negative external terminal to be fitted therein (see FIG. 12). This bus-bar recess 330*f* is configured to have an opening in a back surface 330*d* of the bus bar 330 and be recessed from the back surface 330*d* toward the front surface 330*c* of the bus bar 330. Furthermore, each bus bar 330 includes a bus bar protruding portion 330*h* that protrudes from the front surface of the bus-bar recess 330*f*, that is, upward in FIG. 12. The bus-bar recess 330*f* and the bus bar protruding portion 330*h* each have an approximately hemisphere face.

In the second example, the bus-bar recess 330*f* is also formed in such a manner that a rectangular flat plate-shaped bus bar 330 (a substrate) is subjected to press work. When this rectangular flat plate-shaped bus bar 330 (the substrate) is pressed, the foregoing bus-bar recess 330*f* is formed and simultaneously the foregoing bus bar protruding portion 330*h* is formed. In the second example, the bus-bar recess 330*f* and the bus bar protruding portion 330*h* of the bus bar 330 form a part of the opposed portion 330*g*. To be concrete, the bus-bar recess 330*f* becomes a back-side portion of the opposed portion 330*g* and the bus bar protruding portion 330*h* becomes a front-side portion of the opposed portion 330*g* (see FIGS. 12 and 15). The opposed portion 330*g* is a part of the bus bar 330, opposed to the space S via the separated portion 237*g* or 247*g* in the thickness direction DT of the external terminal (i.e., the positive external terminal 237 or the negative external terminal 247).

Furthermore, in the battery pack 301 in the second example, as shown in FIG. 12, the external terminals (i.e., the positive external terminal 237 and the negative external terminal 247) and the bus bar 330 are welded while the terminal protruding portion 237*h* of the positive external terminal 237 and the terminal protruding portion 247*h* of the negative external terminal 247 are fitted in the corresponding bus-bar recesses 330*f* of the bus bar 330.

When the bus bar 330 is to be welded to the external terminals (the positive external terminal 237 and the negative external terminal 247), the the terminal protruding portion 237*h* of the positive external terminal 237 and the terminal protruding portion 247*h* of the negative external terminal 247 are fitted in the bus-bar recesses 330*f* of the bus bar 330. Thus, the bus bar 330 is prevented from causing positional displacement with respect to the external terminals (the positive external terminal 237 and the negative external terminal 247). Therefore, the battery pack 301 in the second example is a battery pack configured such that the bus bar 330 is welded to the external terminals (the positive external terminal 237 and the negative external terminal 247) while the position of the bus bar 330 is held appropriately relative to the external terminals (the positive external terminal 237 and the negative external terminal 247).

The manufacturing method of the battery pack 301 in the second example will be described below. FIG. 8 is a flowchart showing a process flow of the manufacturing method of the battery pack 301 in the second example. In step T1 (a cell preparing step), firstly, a plurality of cells 200 are prepared; that is, a plurality of cells 200 in each of which the bus bars 330 are not yet welded to the positive external terminal 237 and the negative external terminal 247.

In step T2 (a cell stack fabricating step, see FIG. 8), successively, the predetermined number of the prepared cells 200 are disposed in a row in the row direction DL (in the right-left direction in FIG. 1) to fabricate a cell stack 320. In the second example, more concretely, as in the first example, the cell stack 320 is fabricated in such a configuration that the cells 200 are aligned in a row by alternately reversing the orientations of the cells 200 located adjacently in the row direction DL so that the positive external terminal 237 of a cell 200 and the negative external terminal 247 of a cell 200 adjacent thereto in the row direction DL are located side by side (see FIG. 1).

The cell stack 320 is then housed in the housing cavity 10*b* of the housing case 10 (see FIG. 1). In the second example, as in the first example, a cooling plate is interposed between the cells 200 adjacently arranged in the row direction DL. Further, end plates are disposed one by one on both ends of the cell stack 320 in the row direction DL.

Figure 15:
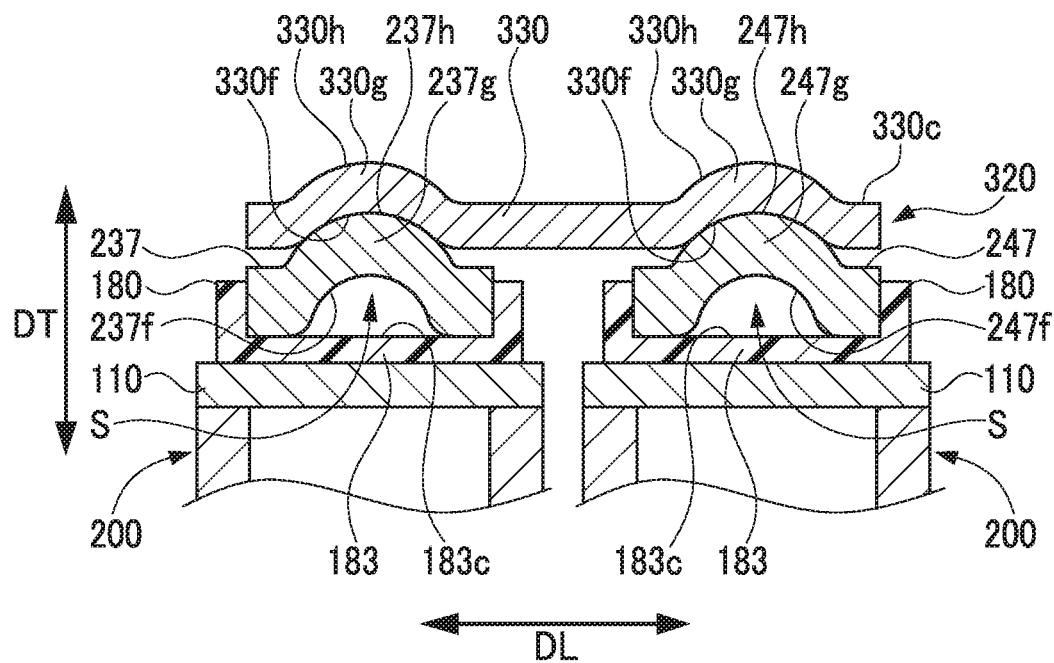
FIG. 15 is an explanatory view for a placing step in the second example.

Subsequently, in step T3 (a placing step, see FIG. 8), as shown in FIG. 15, for each of the cell stacks 320, each bus bar 330 is placed over adjacent two of the front surfaces of the external terminals of the cells 200 adjacently arranged in the row direction DL, that is, each bus bar 330 is disposed on the front surface 237*c* of the positive external terminal 237 of a cell 200 and the front surface 247*c* of the negative external terminal 247 of a cell 200 next thereto. To be specific, a part of the bus bar 330 located on one side in the row direction DL (a left side in FIG. 15) is placed on the front surface of the external terminal (i.e., on the front surface 237*c* of the positive external terminal 237 in the example shown in FIG. 15) of the one-side cell 200 of two cells 200 adjacently arranged in the row direction DL and also a part of the bus bar 330 located on the other side in the row direction DL (a right side in FIG. 15) is placed on the front surface of the external terminal (i.e., on the front surface 247*c* of the negative external terminal 247 in the example shown in FIG. 15) of the other-side cell 200. FIG. 15 is a cross-sectional view showing that two cells 200 shown in FIG. 12 (two cells 200 taken along a line A-A in FIG. 1) are subjected to step T3 (the placing step).

In the second example, however, the bus bar 330 is placed on and across the front surfaces of the external terminals (i.e., the front surface 237*c* of the positive external terminal 237 and the front surface 247*c* of the negative external terminal 247) while the terminal protruding portions of the external terminals (i.e., the terminal protruding portion 237*h* of the positive external terminal 237 and the terminal protruding portion 247*h* of the negative external terminal 247) are fitted in the corresponding bus-bar recesses 330*f* of the bus bar 330. At that time, the bus-bar recess 330*f* and the bus bar protruding portion 330*h* of the bus bar 330 form a part of the foregoing opposed portion 330*g*. Specifically, the bus-bar recess 330*f* becomes a back-side portion of the opposed portion 330*g* and the bus bar protruding portion 330*h* becomes a front-side portion of the opposed portion 330*g* (see FIG. 15).

Since the terminal protruding portions of the external terminals (i.e., the terminal protruding portion 237h of the positive external terminal 237 and the terminal protruding portion 247h of the negative external terminal 247) are fitted in the bus-bar recesses 330f of the bus bar 330 as described above, the bus-bar recess 330f and the bus bar protruding portion 330h of the bus bar 330 can form the opposed portion 330g. Accordingly, in the subsequent step S4 (the laser welding step), when the laser beam is irradiated to the bus bar protruding portions 330h, the opposed portions 330g of the bus bar 330 can be appropriately welded to the separated portions 237g and 247g of the external terminals (i.e., the positive external terminal 237 and the negative external terminal 247).

Since the terminal protruding portions of the external terminals (i.e., the terminal protruding portion 237h of the positive external terminal 237 and the terminal protruding portion 247h of the negative external terminal 247) are fitted in the bus-bar recesses 330f of the bus bar 330, the bus bar 330 can be prevented from causing positional displacement with respect to the external terminals (i.e., the positive external terminal 237 and the negative external terminal 247). In the second example, each of the terminal protruding portions of the external terminals (i.e., the terminal protruding portion 237h of the positive external terminal 237 and the terminal protruding portion 247h of the negative external terminal 247) becomes a part of the separated portion 237g or 247g and each bus-bar recess 330f becomes the corresponding opposed portion 330g. This configuration can prevent positional displacement of the opposed portions 330g with respect to the separated portions 237g and 247g.

Figure 16:
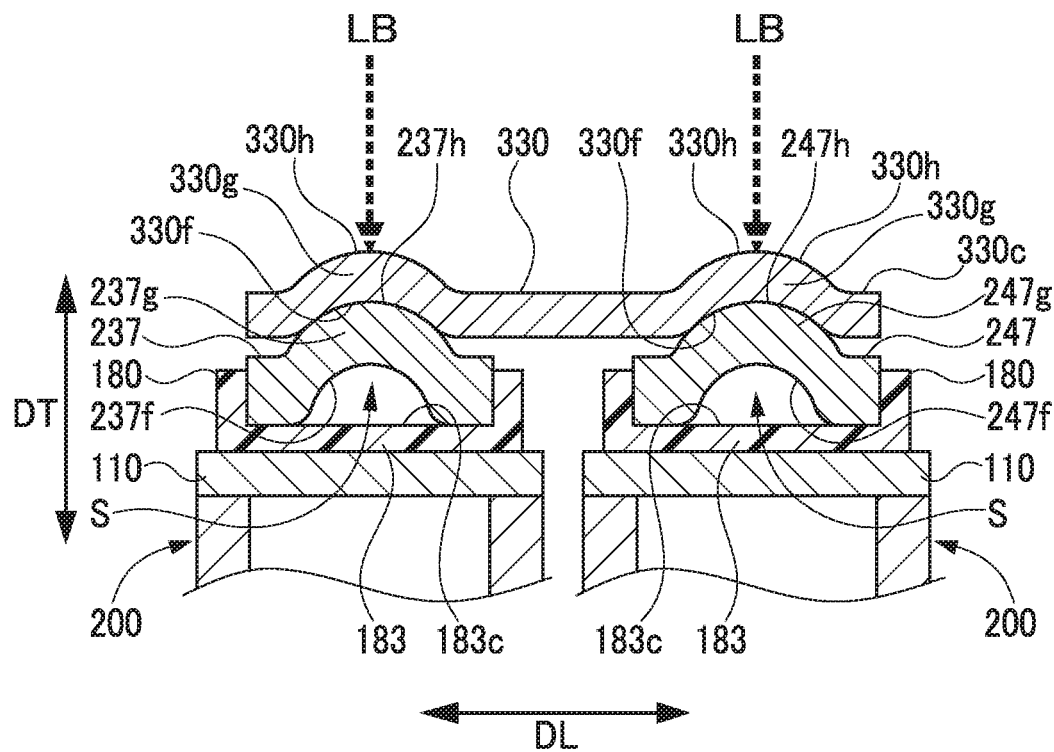
FIG. 16 is an explanatory view for a laser welding step in the second example.

In step T4 (the laser welding step), subsequently, the opposed portions 330g of the bus bar 330 are welded by laser to the corresponding separated portions 237g and 247g of the external terminals (i.e., the positive external terminal 237 and the negative external terminal 247) (see FIG. 16). In the second example, the laser beam LB is irradiated in the thickness direction DT (downward in FIG. 16) of the external terminals (the positive external terminal 237 and the negative external terminal 247) from the side of (i.e., from a position distant from) the front surface 330c of the bus bar 330 (the opposed portion 330g), that is, from above the bus bar 330 in FIG. 16 toward the terminal protruding portions of the external terminals (i.e., the terminal protruding portion 237h of the positive external terminal 237 and the terminal protruding portion 247h of the negative external terminal 247). Accordingly, the opposed portions 330g of the bus bar 330 and the separated portions 237g and 247g of the external terminal (the positive external terminal 237 and the negative external terminal 247) are melted, thereby forming each welded portion 340 at which the separated portion 237g or 247g and the opposed portion 330g are welded together (see FIGS. 12 and 17).

Figure 17:
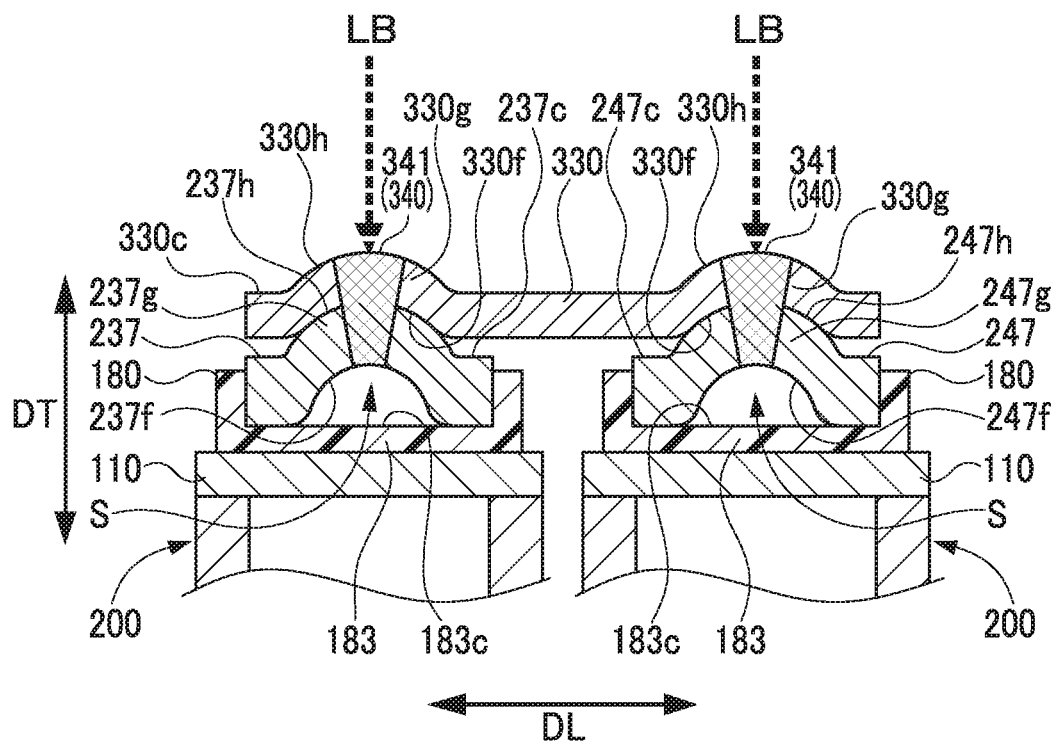
FIG. 17 is another explanatory view for the laser welding step in the second example.

To be concrete, each welded portion 340 is formed as a welded portion configured to extend in the thickness direction DT of the external terminal (i.e., the positive external terminal 237 and the negative external terminal 247) from the front surface 330c of the bus bar 330 toward the back surface of the external terminal (i.e., the back surface 237d of the positive external terminal 237 or the back surface 247d of the negative external terminal 247) and also configured to be located apart from the insulating part 183 by the space S intervening therebetween in the thickness direction DT of the external terminal, that is, configured such that the space S intervenes between the welded portion 340 and the insulating part 183 in the thickness direction DT of the external terminal (see FIGS. 12 and 17). FIGS. 16 and 17 are cross-sectional views each showing the states of two cells 200 shown in FIG. 12, i.e., two cells 200 taken along a line A-A in FIG. 1, in the course of step T4 (the laser welding step).

By step T4 (the laser welding step) performed as above, the heat generated in the external terminals (i.e., the positive external terminal 237 and the negative external terminal 247) and others during laser welding is less likely to conduct to the insulating part 183 made of resin. Specifically, in step T4 (the laser welding step), the space S intervenes between the molten metal portion 341 (i.e., the molten metal portion 341 made of the melted opposed portion 330g of the bus bar 330 or the melted separated portions 237g or 247g of the external terminal) and the insulating part 183 in the thickness direction DT of the external terminals (i.e., the positive external terminal 237 and the negative external terminal 247), so that the heat of the molten metal portion 341 is less likely to conduct to the insulating part 183 (see FIG. 17). Accordingly, the electrical insulation property of the insulating part 183 is prevented from lowering under the influence of the heat generated by laser welding, thereby ensuring electrical insulation between the cell case 110 and the external terminal (i.e., the positive external terminal 237 and the negative external terminal 247).

In the second example, as in the first example, the penetration laser welding is performed to cause the molten metal portion 341 (i.e., the melted portion of the metal constituting the opposed portion 330g of the bus bar 330 or the melted portion of the metal constituting the separated portions 237g and 247g of the external terminals) melted by irradiation of the laser beam LB to extend from the front surface 330c of the bus bar 330 (i.e., the front surface of the opposed portion 330g) and reach the space S as shown in FIG. 17. Accordingly, the welded portion 340 is formed to extend from the front surface of the opposed portion 330g of the bus bar 30 (i.e., the upper surface in FIGS. 12 and 17) to the back surface of the separated portion 237g or 247g of the external terminal (i.e., the positive external terminal 237 or the negative external terminal 247).

The penetration laser welding performed as above to make the molten metal portion 341 reach the space S enables at least a part of gas (air bubbles) contained in the molten metal portion 341 to be released into the space S. This process can reduce voids which may be generated in the welded portion 340, and thus enhance the strength of the welded portion 340. Further, this process can also enhance the electrical conductivity of the welded portion 340 and hence decrease the connection resistance between the bus bar 330 and the positive external terminal 237 and the connection resistance between the bus bar 330 and the negative positive 247.

Additionally, in the second example, as in the first example, each of the spaces S is the enclosed space defined by the terminal recess 237f of the positive external terminal 237 and the front surface 183c of the insulating part 183 that closes the opening of the terminal recess 237f or defined by the terminal recess 247f of the negative external terminal 247 and the front surface 183c of the other insulating part 183 that closes the opening of the terminal recess 247f (see FIG. 17). Those spaces allow accommodation or collection of at least a part of foreign substances, such as spatters, generated during laser welding. In step T4 (the laser welding step), accordingly, the amount of foreign substances such as spatters dispersed outside can be reduced, leading to lowering pollution in external environment.

Since the bus bar 330 is welded to the external terminals (the positive external terminal 237 and the negative external terminal 247) of the cells 200 adjacently arranged in the row direction DL as described above, the adjacent cells 200 in the row direction DL are electrically connected in series through the bus bar 330. Accordingly, a plurality of cells 200 constituting the cell stack 320 are electrically connected in series. As described above, a battery pack 301 (see FIG. 1) in the second example is manufactured.

Figure 18:
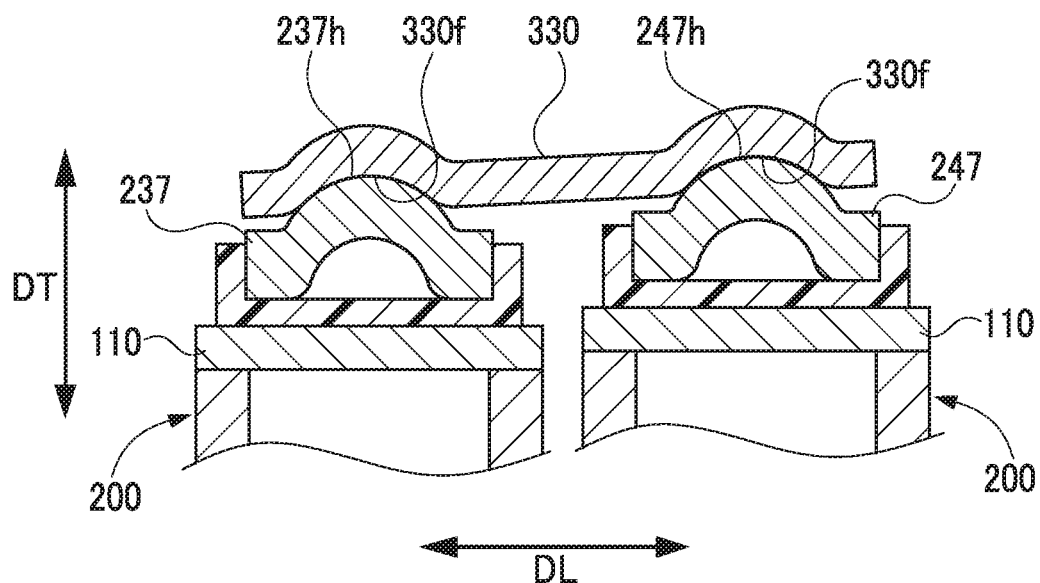
FIG. 18 is another explanatory view for the placing step in the second example.

In the second example, as described above, in step T3 (the placing step), the bus bar 330 is placed on the front surfaces of the external terminals (i.e., the front surface 237c of the positive external terminal 237 and the front surface 247c of the negative external terminal 247) so that the terminal protruding portions of the external terminals (i.e., the terminal protruding portion 237h of the positive external terminal 237 and the terminal protruding portion 247h of the negative external terminal 247) are fitted in the bus-bar recesses 330f of the bus bar 330. Accordingly, even when the external terminals of two cells 200 adjacently arranged in the row direction DL, i.e., the positive external terminal 237 and the negative external terminal 247 are different in height as shown in FIG. 18, the contact area between the external terminal (the positive external terminal 237 or the negative external terminal 247) and the bus bar 330 can be widely acquired. This configuration can reduce the connection resistance between the bus bar 330 and the external terminal (i.e., the positive external terminal 237 or the negative external terminal 247).

The present disclosure is described in adapting to the first and second examples but is not limited thereto. However, the present disclosure is not limited to the above examples and also may be embodied in other specific forms without departing from the essential characteristics thereof.

For instance, each space S in the first example is an enclosed space. As an alternative, the space S may be an open space, that is, an open space defined by the terminal recess 137f of the positive external terminal 137 or the terminal recess 147f of the negative external terminal 147, of which the opening of the terminal recess 137f or 147f is not closed with the front surface 183c of the insulating part 183. The same applies to the second example.

In the first example, the positive external terminal 137 is provided with the terminal recess 137f and the negative external terminal 147 is provided with the terminal recess 147f, and the front surface 183c of the flat plate-shaped insulating part 183 closes the openings of the terminal recesses 137 and 147, thereby forming the space S. As an alternative, the insulating part may be provided with recesses, and the back surface of the flat plate-shaped positive external terminal and the back surface of the flat plate-shaped negative external terminal close the openings of the recesses of the insulating part, thereby forming a space.

REFERENCE SIGNS LIST 1, 301 Battery pack
20, 320 Cell stack
30, 330 Bus bar
30c, 330c Front surface
30g, 330g Opposed portion
40, 340 Welded portion
41, 341 Molten metal portion
100, 200 Cell
110 Cell case
110c Front surface
130, 230 Positive terminal member (Electrode terminal member)
137, 237 Positive external terminal (External terminal)
137c, 237c Front surface
137d, 237d Back surface
137f, 237f Terminal recess
137g, 237g Separated portion
237h, 247h Terminal protruding portion
140, 240 Negative terminal member (Electrode terminal member)
147, 247 Negative external terminal (External terminal)
147c, 247c Front surface
147d, 247d Back surface
147f, 247f Terminal recess
147g, 247g Separated portion
180 First insulator
183 Insulating part
183c Front surface
330f Bus-bar recess
DT Thickness direction
DL Row direction
LB Laser beam
S Space
S1, T1 Cell preparing step
S3, T3 Placing step
S4, T4 Laser welding step

What is claimed is:

1. A method for manufacturing a battery pack, the method comprising:
    providing a bus bar made of metal and formed in a plate shape,
        preparing a plurality of cells to be used in the battery pack, by providing each of the plurality of cells with:
        a metal cell case,
        an external terminal made of metal, formed in a plate shape, and placed on an outside of the cell case, and
        an insulating part made of resin having an electrical insulation property and interposed between a front surface of the cell case and a back surface of the external terminal to electrically insulate the cell case and the external terminal from each other,
        the external terminal including a separated portion to be placed apart from the insulating parts of the plurality of cells in a thickness direction of the external terminal by a space intervening between the separated portion and the insulating part;
    the separated portion being space apart from a swaged part that electrically connects the external terminal to a portion that is connected to an electrode body in the cell;
    placing the bus bar on a front surface of an external terminal of a first cell of the plurality of cells apart from the swaged part so that a part of the bus bar becomes an opposed portion opposed to the space in the thickness direction of the external terminal of the first cell of the plurality of cells by interposing the separated portion of the external terminal of the first cell of the plurality of cells; and
    laser welding the opposed portion of the bus bar to the separated portion of the external terminal of the first cell of the plurality of cells;
    wherein the laser welding includes irradiating a laser beam from a side of a front surface of the bus bar toward the space in the thickness direction of the external terminal of the first cell of the plurality of cells to melt the opposed portion of the bus bar and the separated portion of the external terminal of the first cell of the plurality of cells to form a welded portion at which the separated portion and the opposed portion are welded together, the welded portion being a portion at which the external terminal of the first cell of the plurality of cells and the bus bar are welded together, the welded portion being configured to extend in the thickness direction from the front surface of the bus bar toward the back surface of the external terminal of the first cell of the plurality of cells, and the welded portion being located apart from the insulating part of the first cell of the plurality of cells by the space intervening therebetween in the thickness direction of the external terminal, of the first cell of the plurality of cells, and wherein the external terminal of the first cell of the plurality of cells includes a terminal recess having an opening in the back surface of the external terminal of the first cell of the plurality of cells, the terminal recess being configured to be recessed in a direction away from a front surface of the insulating part of the first cell of the plurality of cells, the front surface facing the back surface of the external terminal of the first cell of the plurality of cells, and the space being an enclosed space defined by the terminal recess of the external terminal of the first cell of the plurality of cells and the front surface of the insulating part of the first cell of the plurality of cells that closes the opening of the terminal recess by contact with the back surface of the external terminal of the first cell of the plurality of cells.

2. The method for manufacturing a battery pack according to claim 1, wherein the laser welding includes performing penetration laser welding to make a molten metal portion melted by irradiation of the laser beam so as to extend from the front surface of the bus bar to the space of the first cell of the plurality of cells to form the welded portion extending from a front surface of the opposed portion of the bus bar to a back surface of the separated portion of the external terminal of the first cell of the plurality of cells.

3. The method for manufacturing a battery pack according to claim 1, wherein the external terminal of the first cell of the plurality of cells includes a terminal protruding portion protruding from the front surface thereof, the bus bar includes a concave bus-bar recess allowing the terminal protruding portion of the first cell of the plurality of cells to be fitted therein, and the placing includes placing the bus bar on the front surface of the external terminal of the first cell of the plurality of cells while making the terminal protruding portion thereof fit in the bus-bar recess.

4. A battery pack comprising:

a plurality of cells, each of the plurality of cells including a metal case and an external terminal made of metal, formed in a plate shape, and placed on an outside of the cell case; and a bus bar made of metal and formed in a plate shape, the bus bar being placed on and welded to a front surface of an external terminal of a first cell of the plurality of cells, and placed apart from a swaged part that electrically connects the external terminal to a portion that is connected to an electrode body in the cell, wherein each of the plurality of cells further comprises:

an insulating part made of resin, having an electrical insulation property, and interposed between a front surface of the cell case and a back surface of the external terminal to electrically insulate the cell case and the external terminal from each other, wherein the battery pack includes a welded portion, at which the bus bar and the external terminal of the first cell of the plurality of cells are welded together, the welded portion being configured to extend in a thickness direction of the external terminal of the first cell of the plurality of cells, from a front surface of the bus bar toward the back surface of the external terminal of the first cell of the plurality of cells, and the welded portion is located apart from the insulating part of the first cell of the plurality of cells by a space intervening therebetween in the thickness direction of the external terminal of the first cell of the plurality of cells, the space being spaced apart from the swaged part, wherein the external terminal of the first cell of the plurality of cells includes a terminal recess having an opening in the back surface thereof, the terminal recess being configured to be recessed in a direction away from a front surface of the insulating part of the first cell of the plurality of cells, the front surface facing the back surface of the external terminal of the first cell of the plurality of cells, and the space of the first cell of the plurality of cells is an enclosed space defined by the terminal recess of the external terminal of the first cell of the plurality of cells, and the front surface of the insulating part that closes the opening of the terminal recess of the first cell of the plurality of cells by contact with the back surface of the external terminal of the first cell of the plurality of cells.

5. The battery pack according to claim 4, wherein the external terminal of the first cell of the plurality of cells includes a separated portion located apart from the insulating part of the first cell of the plurality of cells in the thickness direction by the space intervening between the external terminal and the insulating part of the first cell of the plurality of cells, the bus bar includes an opposed portion opposed to the space of the first cell of the plurality of cells by interposing the separated portion in the thickness direction of the external terminal of the first cell of the plurality of cells, and the welded portion at which the separated portion and the opposed portion of the first cell of the plurality of cells are welded together is configured to extend from a front surface of the opposed portion to a back surface of the separated portion of the first cell of the plurality of cells.

6. The battery pack according to claim 4, wherein the external terminal of the first cell of the plurality of cells includes a terminal protruding portion protruding from the front surface of the first cell of the plurality of cells, the bus bar includes a concave bus-bar recess allowing the terminal protruding portion of the first cell of the plurality of cells to be fitted therein, and the external terminal of the first cell of the plurality of cells and the bus bar are welded to each other while the terminal protruding portion of the first cell of the plurality of cells is fitted in the bus-bar recess.

* * * * *